United States Patent [19]

Wagner et al.

[11] 4,396,733

[45] * Aug. 2, 1983

[54] STABILIZED AZULMIC ACIDS, PROCESSES FOR THEIR PREPARATION AND THEIR USE

[75] Inventors: Kuno Wagner, Leverkusen; Kurt Findeisen, Odenthal, both of Fed. Rep. of Germany

[73] Assignee: Bayer Aktiengesellschaft, Leverkusen, Fed. Rep. of Germany

[ * ] Notice: The portion of the term of this patent subsequent to Apr. 21, 1998, has been disclaimed.

[21] Appl. No.: 185,866

[22] Filed: Sep. 11, 1980

Related U.S. Application Data

[62] Division of Ser. No. 11,542, Feb. 12, 1979, Pat. No. 4,247,293.

[30] Foreign Application Priority Data

Feb. 14, 1978 [DE] Fed. Rep. of Germany ....... 2806019

[51] Int. Cl.$^3$ .................... C08L 61/20; C08L 61/32; C05C 9/00; C08F 8/28

[52] U.S. Cl. ........................................... 524/5; 71/11; 524/9; 71/23; 71/31; 524/10; 71/54; 71/61; 524/13; 71/63; 71/64 R; 524/15; 71/64 A; 71/80; 524/16; 71/DIG. 2; 525/509; 524/17; 525/519; 525/540; 524/18; 525/418; 528/362; 524/20; 528/422; 252/8.5 R; 524/21; 524/27; 523/207; 524/34; 524/35; 524/47; 524/49; 524/54; 524/55; 524/56; 524/59; 524/65; 524/72; 524/81; 524/512; 524/542; 524/735; 524/799; 524/877; 523/105; 523/122; 523/128; 523/129; 523/132; 523/205

[58] Field of Search .................. 260/6, 9, 13, 17.3, 260/17.5, 39 R, 96 R; 525/540, 418, 509, 519; 528/362, 422; 252/8.5 R; 71/1, 6, 11, 23, 24, 27, 28, 31, 54, 55, 61, 63, 64 R, 64 A, 80, DIG. 1, DIG. 2

[56] References Cited

U.S. PATENT DOCUMENTS

| | | | |
|---|---|---|---|
| 1,464,802 | 8/1923 | Bohart | 8/636 |
| 1,464,803 | 8/1923 | Bohart | 8/623 |
| 2,855,365 | 10/1958 | Burleson | 106/308 N |
| 2,894,916 | 7/1959 | Burleson | 525/418 |
| 3,160,594 | 12/1964 | Herzog | 71/27 |
| 4,251,255 | 2/1981 | Wagner et al. | 525/540 |
| 4,252,919 | 2/1981 | Wagner et al. | 525/418 |
| 4,263,181 | 4/1981 | Wagner et al. | 260/17.5 |
| 4,283,219 | 8/1981 | Wagner et al. | 260/17.3 |

FOREIGN PATENT DOCUMENTS

| | | |
|---|---|---|
| 662338 | 5/1935 | Fed. Rep. of Germany . |
| 949060 | 8/1956 | Fed. Rep. of Germany . |
| 845363 | 8/1960 | United Kingdom . |

*Primary Examiner*—Lorenzo B. Hayes
*Assistant Examiner*—Nathan M. Nutter
*Attorney, Agent, or Firm*—Gene Harsh; Joseph C. Gil; Richard A. Elder

[57] ABSTRACT

The present invention relates to new azulmic acids stabilized by condensation with carbonyl compounds, several processes for their preparation and their use for various purposes.

16 Claims, No Drawings

STABILIZED AZULMIC ACIDS, PROCESSES FOR THEIR PREPARATION AND THEIR USE

This is a division of application Ser. No. 11,542, filed Feb. 12, 1979, now U.S. Pat. No. 4,247,293.

BACKGROUND OF THE INVENTION

Polymeric hydrocyanic acids, so-called azulmic acids, and several processes for their preparation have already been described (compare Houben-Weyl, volume 8 (1952), page 261; German Patent Specification No. 662,338 and German Patent Specification No. 949,060. Thus, polymeric hydrocyanic acid is obtained, for example, by heating monomeric hydrocyanic acid to the reaction temperature in dilute aqueous solution in the presence of basic catalysts, such as ammonia, sodium cyanide, sodium cyanate, potassium cyanate or alkaline earths, and, after the reaction has started, taking care that a reaction temperature of 120° C. is not exceeded by cooling the mixture (compare German Patent Specification No. 662,338). In a particular variant of this process, further hydrocyanic acid is added to the mixture of solvent- and hydrocyanic acid-catalyst in which the reaction has already started (compare German Patent Specification No. 949,060. These known hydrocyanic acid polymers are brown-black to black pulverulent products which are insoluble in all inert solvents, but which dissolve in 1 N aqueous sodium hydroxide solution, with decomposition, even in the cold. A serious disadvantage of hydrocyanic acid polymers of this type is that both when stored under dry conditions and under moist conditions, small amounts of hydrogen cyanide are continuously split off even at room temperature. As the temperature increases, the rate at which hydrogen cyanide is split off also increases. Amounts of hydrocyanic acid which are far above the legally imposed maximum workplace concentration of hydrocyanic acid of 11 ppm therefore even occur in containers holding azulmic acids no matter how mild the storage conditions are. Use in practice of the known hydrocyanic acid polymers for the most diverse purposes thus presents an exceptional danger to the environment and is therefore scarcely possible.

According to a proposal by Th. Völker, the brown-black polymeric hydrocyanic acid (azulmic acid) prepared in water has essentially the following formula (compare Angew. Chem. 72, (1960) pages 379-384):

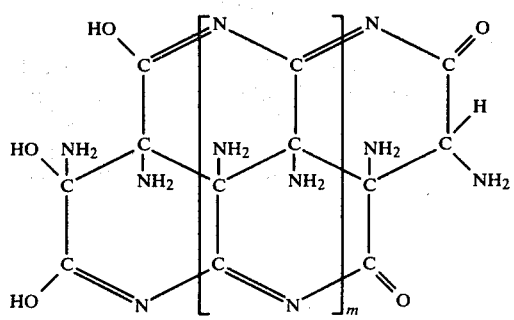

A degree of polymerization (HCN) of X=15-24 has been calculated from the oxygen contents of known azulmic acids, so that values of 1 to 4 result from m (formula I). The maximum molecular weights achieved for the polymers are slightly above 700.

DESCRIPTION OF THE INVENTION

This invention relates to azulmic acids, stabilized by condensation with carbonyl compounds, containing from 0.5 to 55 percent by weight of ionic groups of the formula

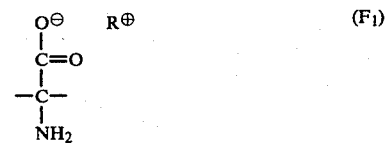

in which R represents hydrogen, ammonium, one equivalent of a protonated or quaternized organic nitrogen base or of a sulphonium cation or one equivalent of a metal cation, and containing from 0.5 to 15 percent by weight of groups formed by decarboxylation reactions of the formula

and acid addition salts and complex compounds of these stabilized azulmic acids, and also mixed products of these stabilized azulmic acids with additives.

The present invention furthermore relates to processes for the preparation of the abovementioned azulmic acids stabilized by condensation with carbonyl compounds, addition salts and complex compounds thereof and the mixed products of these stabilized azulmic acids with additives, the processes consisting of procedures in which (1) modified azulmic acids optionally containing additives and containing from 0.5 to 55 percent by weight of ionic groups of the formula

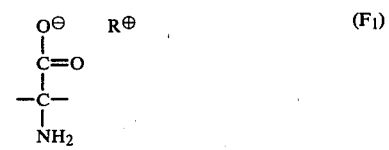

in which R has the meaning indicated above, and containing from 0.5 to 15 percent by weight of groups of the formula

are subjected to a condensation reaction with carbonyl compounds in an aqueous medium, optionally in the presence of additives, or in which (2) Acid addition salts or complex compounds, optionally containing additives, of modified azulmic acids containing from 0.5 to 55 percent by weight of ionic groups of the formula

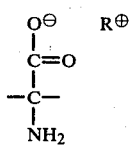 (F₁)

in which R has the meaning indicated above, and containing from 0.5 to 15 percent by weight of groups of the formula

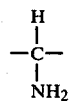 (F₂)

are subjected to a condensation reaction with carbonyl compounds in an aqueous medium, optionally in the presence of additives, or in which (3) azulmic acids which are almost free from structural defects are subjected to a condensation reaction with carbonyl compounds in an aqueous medium, optionally in the presence of additives, or in which (4) hydrocyanic acid is polymerized under hydrolyzing conditions in an aqueous medium with the aid of basic catalysts, optionally in the presence of additives, and the reaction products are then subjected to a condensation reaction with carbonyl compounds, without prior isolation, in an aqueous medium, optionally in the presence of additives, or in which (5) modified azulmic acids containing from 0.5 to 55 percent by weight of ionic groups of the formula

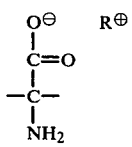 (F₁)

in which R has the meaning indicated above and containing from 0.5 to 15 percent by weight of groups of the formula

 (F₂)

are reacted with bases in an aqueous medium, the cation is optionally replaced by treatment with metal salts and the products are then subjected to a condensation reaction with carbonyl compounds in an aqueous medium, optionally in the presence of additives, in an aqueous medium, or in which (6) modified azulmic acids are treated with organic or inorganic acids in an aqueous medium and the products are then subjected to a condensation reaction with carbonyl compounds in an aqueous medium, optionally in the presence of additives or in which (7) azulmic acids which are almost free from structural defects are subjected to a condensation reaction with carbonyl compounds in an aqueous medium, in the presence of hydrolytically degradable naturally occurring substances and in the presence of an acid, and the products prepared by the processes mentioned are then optionally treated with an acid or base.

The invention furthermore relates to the use of the stabilized azulmic acids according to the invention for various purposes. Thus, the products are suitable, for example, for complexing metal salts as catalyst supports or as catalysts in isocyanate chemistry. Products according to the invention can also be employed for the preparation of dispersions in polyhydroxy compounds which can be foamed with isocyanates. Products according to the invention are furthermore used as reactive fillers in the most diverse plastics. It is possible, for example, to prepare, from substances according to the invention and polycarbodiimide powders, products in which the stabilized azulmic acids are coated, microencapsulated and essentially enclosed by lamination by polycarbodiimides. Those substances according to the invention which have a high ionic constituent and thus have a polyelectrolyte character can function as ion exchangers. Substances according to the invention which contain phosphoric acid, phosphorus acid, polymethyleneureas and/or polymethylenemelamines and other suitable additives, such as alumina and hydrated aluminum oxide, can be used as flameproofing agents, anti-ageing agents and reactive fillers for the most diverse polyurethane plastics, polyamide plastics, rubbers and epoxide resins. Substances according to the invention are additionally suitable as supports for catalysts, interesting mixed catalysts being formed which can be employed in many ways. The use of mixed catalysts of this type for the synthesis of formose may be mentioned as an example. Moreover, products according to the invention can be used as agro-chemicals.

In the present case, by modified azulmic acids there are to be understood those hydrocyanic acid polymers which contain ionic groups of the formulae

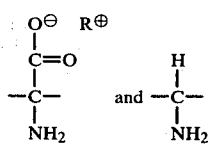

Groups of this type originate from nitrile groups, which are present in azulmic acid and can be regarded as terminal points for the cyclizing nitrile polymerization.

In the ideal case, the transition of a nitrile group of azulmic acid into a corresponding carboxyl group can be illustrated by way of formulae as follows:

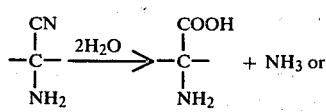 + NH₃ or

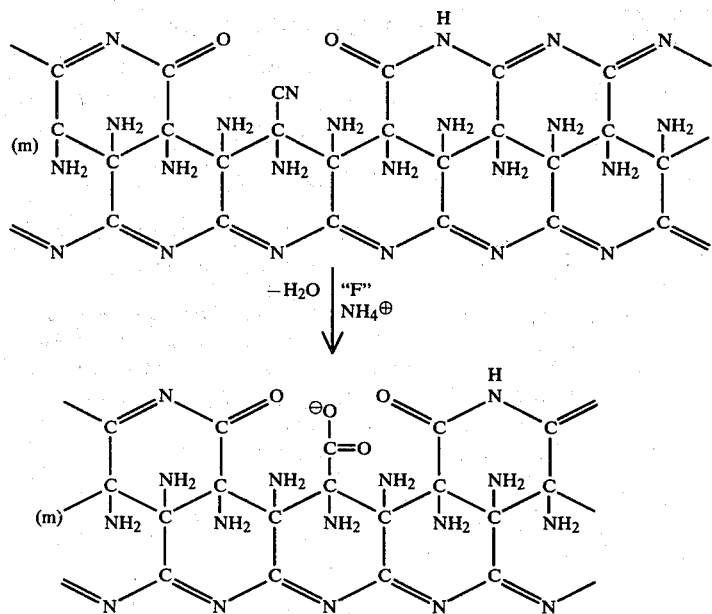

(II)

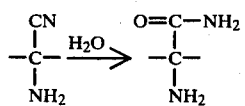

It is, of course, also possible to form amide, imide, amidine or lactam groups from nitrile groups. Thus, for example, the formation of amide groups can be represented by the equation which follows.

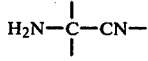

Ionic or non-ionic groups of the above formulae are produced not only at the nitrile groups which are already present in the polymer employed, but also at those nitrile groups which are formed by catalytic decyclization reactions. Furthermore, various other hydrolysis reactions are responsible for the formation of structural defects. For example, a $$H_2N-\overset{|}{\underset{|}{C}}-CN-$$

group, which is to be regarded as an α-aminonitrile in the azulmic acid molecular structure, can be converted into a carbonyl group by splitting off hydrogen cyanide and a subsequent topochemical hydrolysis reaction according to the equation which follows:

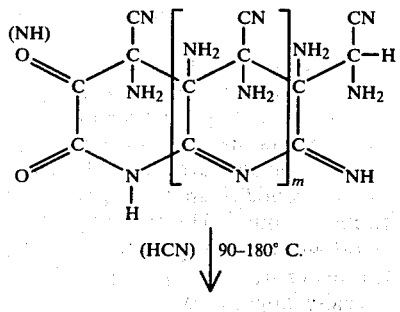
(a)

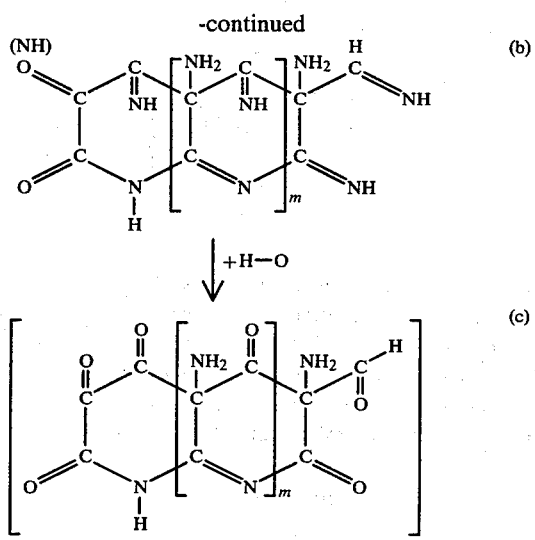
(b)

(c)

In the following text, the ionic groups of the formula

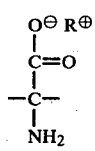

are designated $F_1$ structural defects and the groups of the formula

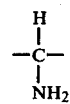

are designated $F_2$ structural defects.

The $F_2$ structural defects are formed from the $F_1$ structural defects, in which R represents hydrogen or another suitable ion, according to the equation which follows:

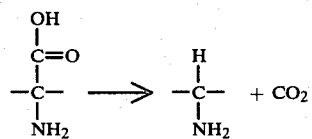

or, in the azulmic acid molecular unit: structural defects by a decarboxylation reaction

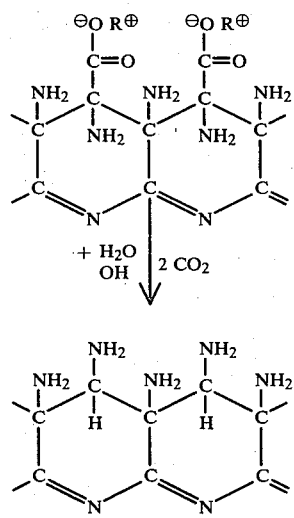

increase in the concentration of $NH_2$ groups, loss in acidity, increase in basicity. As can be seen from the formula (II) indicated above, each $F_1$ structural defect produced is directly adjacent to an amino group in the α-position and to an amino group in the β-position. Thus, at $F_1$ structural defects of the formula

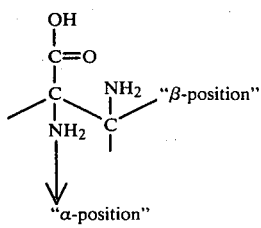

either intramolecular zwitter-ionic salts of the formula

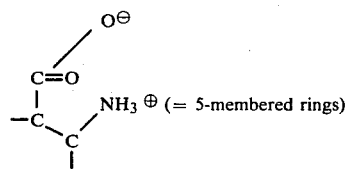

are formed, or intermolecularly crosslinked salts, represented ideally as follows:

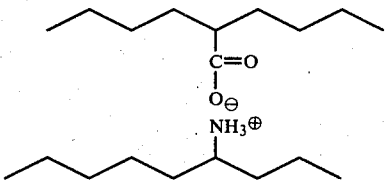

are formed between several azulmic acid molecules. The formation of intramolecular salts, that is to say 5-membered rings, is preferred.

Since the formation of the $F_1$ structural defects is coupled with the liberation of ammonia and the formation of the $F_2$ structural defects is coupled with the liberation of carbon dioxide, the amount of ammonia and carbon dioxide evolved is a quantitative measure of the number of structural defects produced. The quotient of the molar amount of ammonia evolved and the molar amount of carbon dioxide evolved provides information on the ratio of $F_1$ structural defects to $F_2$ structural defects.

In the following text, the content of structural defects, in percent by weight, in the modified azulmic acids according to the invention is in each case determined by relating the equivalent weight of the structural defect concerned (=ionic or non-ionic grouping $F_1$ or $F_2$) to the corresponding weight (100 g) not converted into an ionic or non-ionic grouping. Thus, for example, the concentration of structural defects for an $F_1$ structural defect in which R represents hydrogen is calculated from the particular molar amount of ammonia formed and the fact that the associated ionic grouping of the formula

has an equivalent weight of 73.

In an analogous manner, the content of $F_2$ structural defects is calculated from the particular amount of carbon dioxide evolved and the fact that the relevant grouping of the formula

has an equivalent weight of 29.

It is to be described as exceptionally surprising that, in contrast to the azulmic acids hitherto known, the azulmic acids according to the invention, which have been subjected to a condensation reaction with carbonyl compounds, and acid addition salts and complex compounds thereof and mixed products thereof with additives are extremely resistant towards splitting off of hydrogen cyanide. Thus, at temperatures of up to 130° C., in some cases at temperatures of up to 180° C. and in extreme cases even at temperatures of up to 200° C., virtually no hydrogen cyanide is split off from the product according to the invention. The amounts of hydrogen cyanide split off which can be detected analytically are zero or, even under most unfavorable conditions, are below the legally imposed maximum workplace concentration. Furthermore, the products according to the invention are also very stable towards hydrolytic splitting off of hydrogen cyanide. Thus, even after treating azulmic acids, stabilized according to the invention, in an aqueous medium at 100° C. for three hours, no cyanide ions, or less than $0.2 \times 10^{-6}$ g of cyanide ions per gram of water, can be detected. It is also surprising that the azulmic acids according to the invention, stabilized by condensation with carbonyl compounds, and acid addition salts and complex compounds thereof and mixed products thereof with additives are accessible from the known azulmic acids by a topochemical reaction, although the polymers employed as starting materials are completely insoluble and, because of the low porosity, have only a relatively small surface area. Moreover, the ease of preparation of the products according to the invention could not be expected, in particular because the known azulmic acids, which are almost free from structural defects, remain completely unchanged even after boiling with anhydrous acetone, cyclohexanone, methyl isobutyl ketone or ethyl acetoacetate for hours.

The azulmic acids according to the invention, stabilized by condensation with carbonyl compounds, have a substantially higher swellability than the previously known azulmic acids which are almost free from structural defects, and therefore, in contrast to the previously known azulmic acids, can be employed for the most diverse chemical reactions. As already mentioned, in contrast to the azulmic acids hitherto known, which are almost free from structural defects, they are also distinguished by a very high resistance towards splitting off of hydrogen cyanide under the influence of heat and under hydrolysis conditions, and may be used for many purposes.

The substances according to the invention thus represent a valuable enrichment of the art.

Possible carbonyl compounds which the products according to the invention contain in a condensed form are preferably aldehydes, ketones and keto esters with reactive carbonyl groups. Aldehydes which may be mentioned in particular are formaldehyde, acetaldehyde, isobutyraldehyde, chloral, hydroxyethylaldehyde, hydroxypivalaldehyde, acrolein, crotonaldehyde, glyoxal, methylglyoxal, furfurol, hydroxymethylfurfurol, glucose, salicylaldehyde, hydroxyacetaldehyde, glyceraldehyde and other aldehydes which are formed from formaldehyde under the conditions of the synthesis of formose. Formaldehyde is particularly preferred. Ketones which may be mentioned in particular are dihydroxyacetone and cyclohexanone; ethyl acetoacetate may be mentioned as an example of a keto ester.

The structural defects contained in the stabilized azulmic acids according to the invention are defined by the formulae (F$_1$) and (F$_2$). In the formula (F$_1$), R preferably represents hydrogen, ammonium or one equivalent of a cation of a metal from main groups I to V or from sub-groups I to VIII, examples which may be mentioned being the cations of lithium, sodium, potassium, beryllium, magnesium, calcium, strontium, barium, aluminum, thallium, tin, lead, bismuth, copper, silver, gold, zinc, cadmium, mercury, titanium, zirconium, chromium, manganese, iron, cobalt, nickel, platinum and palladium, rhodim and rutenium. R furthermore preferably represents one equivalent of a protonated alkylamine with 1 to 6 carbon atoms, a protonated dialkylamine with 1 to 6 carbon atoms per alkyl group, a protonated trialkylamine with 1 to 6 carbon atoms per alkyl group, a protonated hydroxyalkylamine with 1 to 6 carbon atoms, a protonated di(hydroxy-alkyl)-amine with 1 to 6 carbon atoms per hydroxyalkyl group, a protonated tri-(hydroxyalkyl)-amine with 1 to 6 carbon atoms per hydroxyalkyl group, a protonated cycloalkylamine with 3 to 8 carbon atoms, a protonated alkylenediamine with 2 to 6 carbon atoms, a protonated guanidine, melamine or dicyandiamide or of a protonated, saturated or unsaturated heterocyclic nitrogen base with 5 to 7 ring members and 1 to 3 nitrogen atoms in the heterocyclic ring, and also represents those cations which are formed by quaternization, such as, for example, permethylation, of the abovementioned basic nitrogen compounds. Particularly preferred nitrogen bases in this context are methylamine, dimethylamine, trimethylamine, ethylamine, diethylamine, triethylamine, tert.-butylamine, ethanolamine, diethanolamine, triethanolamine, cyclopropylamine, cyclopentylamine, cyclohexylamine, ethylenediamine, pyrrolidine, piperidine, morpholine, imidazole, pyrazole, 1,2,4-triazole, 1,2,3-triazole, 2-ethylimidazole and aminotriazole. R also preferably represents trialkylsulphonium cations, in particular the triethylsulphonium cation.

By acid addition salts, according to the invention, of azulmic acid which are stabilized by condensation with polycarbonyl compounds there are to be understood those salts which are formed by addition of a proton of an inorganic or organic acid onto an amino group or another suitable group in a stabilized azulmic acid. Preferred possible inorganic acids here are hydrogen halide acids, such as hydrofluoric acid, hydrochloric acid and hydrobromic acid, and furthermore phosphorus acids, such as phosphoric acid, phosphorous acid, dialkylphosphoric acid, for example dibutylphosphoric acid, polyphosphoric acid with molecular weights from 6,000 to 40,000 and phospholine oxide-phosphonic acids, for example those of the formulae

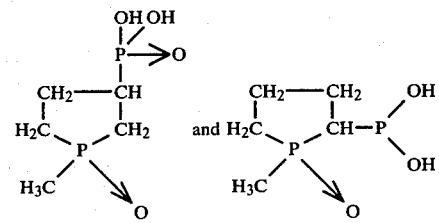

and furthermore nitric acid and acids derived from sulphur, such as sulphuric acid and sulphonic acids, examples which may be mentioned being ethylsulphonic acid, p-toluenesulphonic acid and naphthalene-1,5-disulphonic acid. Preferred possible organic acids are saturated or unsaturated carboxylic acids, such as formic acid, acetic acid, propionic acid, 2-ethylcaproic acid, acrylic acid, methacrylic acid, oleic acid and ricinoleic acid, and furthermore halogeno-carboxylic acids, such as chloroacetic acid, dichloroacetic acid and trichloroacetic acid, and also dicarboxylic acids, such as maleic acid, fumaric acid and succinic acid, and half-esters derived therefrom, and in addition hydroxy-carboxylic acids, such as hydroxyacetic acid, tartaric acid, citric acid and salicylic acid.

By azulmic acid complex compounds according to the invention, stabilized by condensation with carbonyl compounds, there are to be understood, preferably, complexes of stabilized azulmic acids and metal compounds or ammonium salts. Possible metal compounds here are, in particular, salts, acids, hydroxides and oxides of metals of main groups II to V or of sub-groups I to VIII. Examples which may be mentioned are calcium chloride, acetate, nitrate, hydroxide and oxide, strontium nitrate, barium chloride and acetate, borates, aluminum acetate and formate, thallium sulphate, thallium nitrate, silicon tetrachloride, sodium and potassium silicate, tin-II chloride, lead-II chloride, acetate and hydroxide, bismuth-III hydroxide and bismuth-III nitrate, copper sulphate, nitrate and acetate, silver nitrate, aurichlorohydric acid, zinc chloride and acetate, cadmium chloride, mercury-II chloride, titanium tetrachloride and tetrabutylate, zirconium sulphate, vanadates, chromium-III chloride, molybdates, tungstates and hetero-polyacids thereof, manganese-II sulphate and acetate, iron-II sulphate and acetate and iron-III chloride, cobalt chloride, nickel chloride, hexachloroplatinic acid and palladium-II chloride. Possible ammonium salts are, in particular, ammonium nitrate and ammonium acetate.

Additives which the products according to the invention can contain are naturally occurring organic substances and products obtained therefrom, naturally occurring inorganic substances and products obtained therefrom, synthetic organic products, synthetic inorganic products and/or mixed products consisting of organic and inorganic products.

Preferred possible naturally occurring organic substances and products obtained therefrom are, in this case, wood flour, lignin powder, lignin-sulphonic acids, ammonified lignin-sulphonic acids, humus, humic acids, ammonified humic acids, peat, proteins and degradation products, for example hydrolysis products, of yeasts, algal material (alginates), polypeptides, such as wool and gelatin, fish-meal and bone-meal, and furthermore aminoacids, oligopolypeptides, pectins, monosaccharides, such as glucose and fructose, disaccharides, such as sucrose, oligosaccharides, polysaccharides, such as starch and cellulose, and also hemicelluloses, homogenized materials of vegetable and animal origin, active charcoals and ashes which are obtainable by partial oxidation, complete oxidation or combustion of organic substances formed by photosynthesis or of customary fuels, fir ash, broom ash, ash of Serbian spruce, oak ash, birch ash, beech ash, willow ash and tobacco leaf ash being mentioned in particular.

Preferred possible naturally occurring inorganic substances and products obtained therefrom are silicates such as aluminum silicates, calcium silicates, magnesium silicates and alkali metal silicates, furthermore sea sand and other naturally occurring silicon dioxides, silicic acids, in particular disperse silicic acids, silica gels, and also clay minerals, mica, carbonates, such as calcium carbonate, phosphorite and phosphates, such as calcium phosphate and ammonium magnesium phosphate, sulphates, such as calcium sulphate and barium sulphate, and in addition oxides, such as zirconium dioxide, nickel oxide, palladium oxide, barium oxide, disperse antimony oxides and aluminum oxides, such as bauxite and hydrated aluminum oxide, and further fly ashes and the most diverse types of carbon black.

Preferred possible synthetic organic products are aminoplast condensates, in particular those of urea, dicyandiamide, melamine or oxamide and aldehydes, such as formaldehyde, acetaldehyde, isobutyraldehyde, hydroxypivalaldehyde, crotonaldehyde, hydroxyacetaldehyde, furfurol hydroxymethylfurfurol, glyoxal and glucose, particular products which may be mentioned being condensation products of urea and formaldehyde, urea and glyoxal, urea and acetaldehyde, urea and isobutyraldehyde, urea and crotonaldehyde, urea and hydroxypivalaldehyde and 2-oxo-4-methyl-6-ureido-hexahydropyrimidine, which is a known condensation product of 1 mol of crotonaldehyde and 2 mols of urea and is formed from the intermediate product crotonylidene-diurea by saturation of the double bond and has the formula

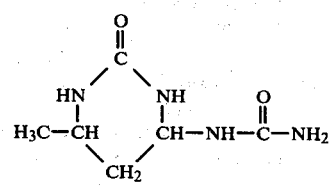

Further preferred possible synthetic organic products are plastics, such as polyamide powders, polyurethane powders and polycarbodiimides, and furthermore polymeric quinones, addition products and condensation products of quinones, in particular benzoquinone, with amines or ammonia, and also with aldehydes, in particular formaldehyde, cross-linked gelatin, synthetic agents for improving soil, such as, for example, the product known as Hygromull (=urea/formaldehyde resin flakes), furthermore synthetic sugars, such as, for example, formose sugar mixtures prepared from formaldehyde, and also sparingly soluble cane sugar complexes, such as the sucrose-calcium oxide complex having the composition 1 mol of sucrose. 3 moles of calcium oxide and finally organic ammonium salts, such as ammonium carbaminate, and other organic nitrogen compounds, such as hexamethylenetetramine and hexahydrotriazines.

Preferred possible synthetic inorganic products which may be mentioned are fertilizers, such as superphosphate, basic slag, Rhenania phosphate, phosphorite, calcium cyanamide, calcium ammonium nitrate, Leuna saltpeter, potassium phosphates, potassium nitrate and ammonium nitrate, and furthermore pigments, such as iron oxides and titanium dioxides, and also metal oxides and metal hydroxides, such as calcium oxide, calcium hydroxide, lead hydroxide, bismuth hydroxide, manganese hydroxide and magnesium hydroxide, hydroxides which are prepared in situ being particularly preferred, and furthermore synthetic silicic acids, in particular silicic acid prepared in situ, and salts thereof, and also waterglass, salts such as cobalt molybdate, ammonium carbonate and calcium carbonate, and in addition catalysts, in particular heavy metal catalysts, of the most diverse nature.

Preferred possible mixed products consisting of inorganic and organic products are neutral, basic or acid soids, naturally occurring agents for improving soil, biologically active garden mold and sewage sludges.

The additives can be physically and/or chemically bonded to the products according to the invention in an amount of from 1 to 95 percent by weight, preferably from 5 to 90 percent by weight. In some cases they can be products in which the stabilized azulmic acids are coated by the additives. Stabilized azulmic acids coated, for example micro-encapsulated, by polycarbodiimides may be mentioned as an example of products of this type.

The common characteristic of processes (1) to (7) according to the invention is the condensation of amino, amide, amidine or lactam groups, present in the azulmic acids employed, with carbonyl groups. If, for example, formaldehyde is used as the carbonyl component, condensation thereof with an amino group of an azulmic acid can be illustrated, for example, by the equation which follows:

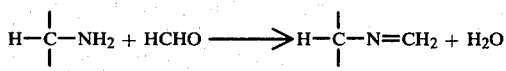

Reactions which lead to methylol compounds, N,N-methylene compounds or compounds with methylene ether linkages ($>$N—CH$_2$—O—CH$_2$N$<$) can proceed in addition to the formation of azomethine groups shown by way of the equation. Azomethine groups (—N=CH$_2$) readily crosslink to give hexahydrotriazine structures, partial formation of hexahydropyrimidine derivatives by intramolecular condensation of cis-amino groups present in the α-position also being possible.

In process (1) according to the invention, modified azulmic acids optionally containing additives and containing from 0.5 to 55 percent by weight of ionic groups of the formula

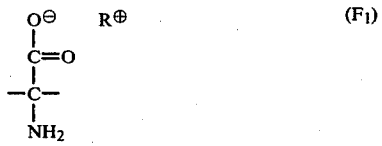

and containing from 0.5 to 15 percent by weight of groups of the formula

are subjected to a condensation reaction with carbonyl compounds in an aqueous medium, optionally in the presence of additives.

In the formula (F$_1$), R preferably represents those substituents which have already been mentioned as preferred for R in connection with the description of the substances according to the invention.

The modified azulmic acids to be used as starting materials in process (1) according to the invention (=azulmic acids containing structural defects) can contain 1 to 95 percent by weight, preferably 5 to 90 percent by weight, of additives. Possible additives here are naturally occurring organic substances and products obtained therefrom, naturally occurring inorganic substances and products obtained therefrom, synthetic organic products, synthetic inorganic products and/or mixed products consisting of organic and inorganic products. These include, preferably, those materials which have already been mentioned as preferred in connection with the description of the additives optionally present in the substances according to the invention.

The modified azulmic acids, optionally containing additives, required as starting materials are hitherto unknown. However, they can be prepared in a simple manner by various processes. Thus, the products concerned, which are the subject of U.S. patent application Ser. No. 11,589 filed FEb. 12, 1979 obtained by a process in which (A) azulmic acid, which is known and almost free from structural defects, in an aqueous medium,
   (a) is treated with organic or inorganic acids, optionally in the presence of additives, or
   (b) is treated with bases or basic salts, optionally in the presence of additives, or
   (c) is treated with water in the neutral range, or
   (d) is treated with vegetable ashes, catalytically active naturally occurring substances and/or fertilizers, or
   (e) is treated with metal salts, optionally in the presence of oxidizing agents and optionally in the presence of organic acids, or
   (f) is treated with metal salt complexes of stabilized azulmic acids, or
   (g) is treated with oxidizing agents, or in which
(B) hydrocyanic acid is polymerized under hydrolyzing conditions in an aqueous medium with the aid of basic catalysts, optionally in the presence of additives, and the products prepared by the processes mentioned are then optionally treated with an acid or base.

Hydrocyanic acid polymers which are almost free from structural defects, so-called azulmic acids, are used as starting materials in the preparation of the modified azulmic acids, optionally containing additives, by process (A), variants (a) to (g). Azulmic acids of this type which are almost free from structural defects are already known (compare Houben-Weyl, volume 8 (1952), page 261; German Patent Specification No. 662,338 and German Offenlegungsschrift No. 949,060).

According to variant (a) of process (A), the azulmic acids which are almost free from structural defects are treated with inorganic or organic acids, optionally in the presence of additives. Preferred possible inorganic or organic acids for this treatment are preferably all those which have already been listed as preferred in connection with the description of the stabilized acid addition products, according to the invention, of azulmic acid. Additives which can be used are naturally occurring organic substances and products obtained therefrom, naturally occurring inorganic substances and products obtained therefrom, synthetic organic products, synthetic inorganic products and/or mixed products consisting of organic and inorganic products. These include, preferably, all those materials which have already been mentioned as preferred in connection with the description of the additives optionally present in the substances according to the invention.

Variant (a) of process (A) is carried out in an aqueous medium, preferably in water. However, it is also possible to replace some of the water by other diluents, such as hydrogen sulphide or alcohols, methanol and ethanol being mentioned in particular.

In the case of variant (a) of process (A), the reaction temperatures can be varied within a substantial range. In general, the reaction is carried out between 0° C. and 200° C., preferably between 20° C. and 120° C.

In general, the reaction according to variant (a) of process (A) is carried out under normal pressure. However, it is also possible to carry out the reaction under increased pressure.

In carrying out variant (a) of process (A), a catalytic amount or 1 to 4 mols of an inorganic or organic acid and optionally an amount of additives such that the proportion thereof in the end product is between 1 and 95 percent by weight, preferably between 5 and 90 percent by weight, are employed per 1 mol (relative to the molecular unit

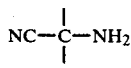

with the equivalent weight 54) of azulmic acid which is almost free from structural defects. The mixture is worked up by customary methods. In general, a procedure follows in which, after the reaction has ended, the reaction mixture is filtered and the solid product obtained is appropriately washed and dried.

If nitric acid is used for producing structural defects in carrying out variant (a) of process (A), and the reaction temperature is thereby kept relatively low, preferably between 20° and 30° C., traces of hydrocyanic acid split off are oxidized, while at the same time addition reactions of nitric acid with the amino groups of the modified azulmic acids take place extremely readily, and types of modified azulmic acids which contain ionic groups of the formula

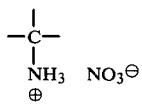

on their amino groups are obtained by a simple topochemical reaction.

In this manner, about 0.5 mol of nitric acid is bonded per 100 parts by weight of modified azulmic acid. Depending on the type of process and the reaction time of the dilute nitric acid on the modified azulmic acids, about 30 to 50% of the amino groups present are available for salt formation. Traces of free nitric acid can advantageously be converted into ammonium nitrate by gassing the products with gaseous ammonia, the reaction advantageously being carried out in the solid phase in a fluidized bed.

If phosphoric acid or phosphorous acid is used for producing structural defects in carrying out variant (a) of process (A), and the reaction temperatures are thereby kept relatively low, preferably between 20° C. and 55° C., decarboxylation reactions and the productions, associated therewith, of $F_2$ structural defects are largely suppressed. At the same time, the acids are bonded extremely readily by the amino groups of the modified azulmic acids in a heterogeneous reaction. In this manner, about 0.2 mol of phosphoric acid, or about 0.5 mol of phosphorous acid, are already bonded by about 100 parts by weight of modified azulmic acid within five minutes. The salts formed are almost water-insoluble. Small amounts of free phosphoric acid or phosphorous acid contained in the products can advantageously be converted into the corresponding ammonium salts by treating the products with gaseous ammonia, the reaction advantageously being carried out in the solid phase in a fluidized bed.

In a particular embodiment of variant (a) of process (A), the azulmic acid is reacted with 0.2 to 80% strength phosphoric acid or phosphorous acid in the presence of naturally occurring hydrolytically degradable substances, such as, for example, celluloses, hemicelluloses, sugars, lignin, polymeric quinones, wood flour, vegetable material, polypeptides, such as gelatin and wool, and furthermore yeast proteins, algal compositions and peat compositions. In this embodiment, the structural defects are produced with simultaneous hydrolytic degradation of the particular naturally occurring substances employed. If polypeptides are used, these are split into aminoacid mixtures. Because of its numerous amino groups, the azulmic acid bonds about 0.3 to 0.4 mol of phosphoric acid or phosphorous acid, while the phosphoric acid salts of the aminoacids or those of the oligopolypeptides, or the other low-molecular degradation products of the naturally occurring substances employed are frequently fixed by the azulmic acid matrix in a large amount, even when they are water-soluble. Excess acid, for example phosphoric acid, can be precipitated as calcium phosphate on the azulmic acid matrix by adding calcium hydroxide. If hydrolyzed sugars and oligosaccharides are present in this case, they are absorbed on the azulmic acid in the form of their calcium complexes, which are usually sparingly soluble. The process products obtained by this variant of process (A) can be stored for a relatively long period without unpleasant odors being formed, as is otherwise the case when naturally occurring substances such as oligopeptides, peptide/sugar mixtures and the like are degraded by biological processes.

A further particular embodiment of variant (a) of process (A) consists of a procedure in which, in order to produce the structural defects, 1 to 4 mols of 1 molar phosphoric acid solution are employed and the excess phosphoric acid is then precipitated as calcium phosphate by adding calcium chloride, as magnesium phosphate by adding magnesium chloride or as ammonium magnesium phosphate by adding ammonium and magnesium salts. Additives of the most diverse nature can also be used at the same time during this procedure. Particularly preferred additives in this case are vegetable ashes, insoluble polyquinones, addition products or condensation products of benzoquinone and amines, in particular ammonia, and furthermore lignin, lignin-sulphonic acids, humic acids, diverse fly ashes, bauxite, aluminum oxide, cobalt molybdate, silicon dioxide, active charcoal, zirconium dioxide, nickel oxide, palladium oxide and barium oxide. Further preferred possible additives are also sugars, such as cane sugar and other sugars containing no free aldehyde groups, or formose sugar mixtures prepared from formaldehyde. These very diverse types of sugars can be fixed in the channels and pores of the solid azulmic acid matrix. Furthermore, the various sugars can also be absorbed onto the azulmic acids in the form of their calcium complexes, which are usually sparingly soluble.

According to variant (b) of process (A), the azulmic acids which are almost free from structural defects are treated with bases or basic salts, optionally in the presence of additives. Both organic and inorganic bases can be used as the bases here. Organic bases which can preferably be used are ammonia, alkylamines with 1 to 6 carbon atoms, dialkylamines with 1 to 6 carbon atoms per alkyl group, trialkylamines with 1 to 6 carbon atoms per alkyl group, hydroxyalkylamines with 1 to 6 carbon atoms, di-(hydroxyalkyl)-amines with 1 to 6 carbon atoms per hydroxyalkyl grouup, tri-(hydroxyalkyl)-amines with 1 to 6 carbon atoms per hydroxyalkyl group and alkyl-hydroxyalkyl-amines with 1 to 6 carbon atoms in the alkyl group and in the hydroxyalkyl group. Cycloalkylamines with 3 to 8 carbon atoms, alkylenediamines with 2 to 6 carbon atoms, guanidine, melamine, dicyandiamide, saturated or unsaturated heterocyclic nitrogen bases with 5 to 7 ring members and 1 to 3 nitrogen atoms in the heterocyclic ring, and those bases which are derived from the compounds formed by quaternization, for example permethylation, of the abovementioned nitrogen compounds, and furthermore those bases which are derived from trialkylsulphonium compounds. Particularly preferred nitrogen bases in this context are ammonia, methylamine, methylethanolamine, dimethylamine, trimethylamine, ethylamine, diethylamine, triethylamine, tert.-butylamine, ethanolamine, diethanolamine, triethanolamine, cyclopropylamine, cyclopentylamine, cyclohexylamine, ethylenediamine, pyrrolidine, piperidine, morpholine, imidazole, pyrazole, 1,2,4-triazole, 1,2,3-triazole, 2-ethylimidazole, aminotriazole and triethylsulphonium hydroxide.

Inorganic bases which can preferably be used are alkali metal hydroxides and alkaline earth metal hydroxides. Lithium hydroxide, sodium hydroxide, potassium hydroxide, magnesium hydroxide, calcium hydroxide, strontium hydroxide and barium hydroxide may be mentioned in particular.

Preferred possible basic salts for carrying out variant (b) of process (A) are alkali metal sulphides, such as sodium sulphide, sodium bisulphide and potassium bisulphide, and further sodium thiosulphate, ammonium thiosulphate, ammonium polysulphides, calcium bisulphide, calcium thiosulphate and calcium cyanamide, and also potassium carbonate, potassium bicarbonate, potassium cyanate and waterglass (sodium waterglass or potassium waterglass). Mixture of ammonia and sodium thiosulphate, ammonium thiosulphate, sodium bisulphide, sodium sulphate and/or ammonium polysulphides are also particularly suitable for producing structural defects by this method.

Additives which can be used in carrying out variant (b) of process (A) are naturally occurring organic substances and products obtained therefrom, naturally occurring inorganic substances and products obtained therefrom, synthetic organic products, synthetic inorganic products and/or mixed products consisting of organic and inorganic products. These additives include, preferably, all those materials which have already been mentioned as preferred in connection with the description of the additives optionally present in the substances according to the invention.

Variant (b) of process (A) is carried out in an aqueous medium or in an aqueous-alcoholic medium. A preferred possible reaction medium is water, or a mixture of water and an alcohol, such as methanol or ethanol. However, it is also possible to replace some of the water by hydrogen sulphide. If the reaction is carried out in the presence of hydrogen sulphide or in the presence of reagents which release hydrogen sulphide under the reaction conditions and the reaction temperature is kept between 70° C. and 100° C., small amounts of hydrocyanic acid split off are converted into carbon oxysulphide and ammonia, structural defects simultaneously being produced.

The reaction temperatures can be varied within a substantial range in the case of variant (b) of process (A). In general, the reaction is carried out at temperatures between 0° C. and 200° C., preferably between 20° C. and 150° C.

In general, the reaction according to variant (b) of process (A) is carried out under normal pressure. However, it is also possible to carry out the reaction under increased pressure. The latter is particularly advisable if gaseous ammonia is used for producing structural defects.

In carrying out variant (b) of process (A), a catalytic amount, or 1 to 4 mols, preferably 1 to 2 mols, of base or basic salt and optionally an amount of additives such that their proportion in the end product is between 1 and 95 percent by weight, preferably between 5 and 90 percent by weight, are employed per 1 mol (relative to the molecular unit

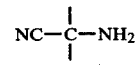

with the equivalent weight 54) of azulmic acid which is almost free from structural defects. The mixture is worked up by customary methods. In general, a procedure is followed in which, after the reaction has ended, the reaction mixture is filtered and the solid product obtained is appropriately washed and dried. The base still contained in the end product can also advantageously be neutralized by adding a corresponding amount of acid, such as, for example, phosphoric acid, so that the products formed then also contain the particular salts.

If an excess of acid is used in this neutralization, acid addition salts of the particular modified azulmic acids are formed.

If strong bases are used for producing structural defects in carrying out variant (b) of process (A), azulmic acids with particularly high contents of structural defects can be prepared after relatively long reaction times. The products formed have a polyelectrolyte character. In the case where potassium hydroxide is employed as the base, the course of a reaction of this type can be illustrated ideally by the equation which follows.

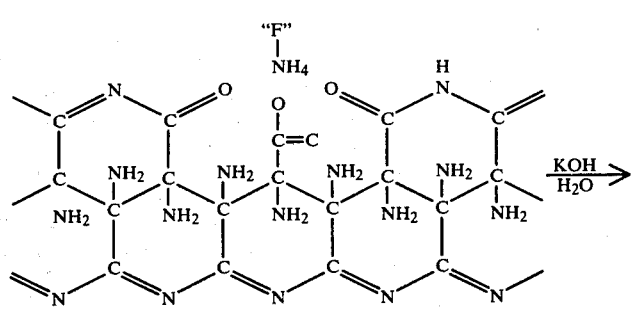

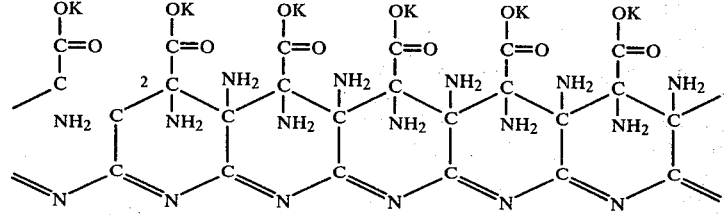

(b)

If an excess of concentrated (25% strength) ammonia solution is used in this variant (b) of process (A), and the reaction is carried out at room temperature, after a reaction time of about 6 to 20 hours, modified azulmic acids which contain a high proportion of structural defects and in which some of the carboxyl groups are present in the form of ammonium carboxylate groups are obtained. However, it is also possible to convert modified azulmic acids in which free carboxyl groups are present into the corresponding products containing the ammonium salt by gassing with ammonia in a fluidized bed.

In a particular embodiment of variant (b) of process (A), the azulmic acid is reacted with gaseous ammonia under pressure in an aqueous-alcoholic medium at temperatures between 120° C. and 140° C. Modified azulmic acids which have a high content of ammonium carboxylate groups are formed in this procedure. The free amino groups contained in these products are capable of additionally also bonding acids, such as, for example, phosphoric acid, so that the end products contain ammonium ions and acid radicals side by side.

In a further particular embodiment of variant (b) of process (A), the azulmic acid is reacted with catalytic amounts, or even with larger amounts, of waterglass—about 1 to 4 mols of waterglass per 100 g of azulmic acid—in a topochemical reaction. In this procedure, modified azulmic acids charged with potassium ions or sodium ions are formed, the saponifiable nitrile groups of which act as latent acids and precipitate silicic acids. The latter are absorbed, in fine distribution, onto the reaction products. Any excess sodium silicate or potassium silicate present can be precipitated by simple gassing of the particular dispersions with carbon dioxide, or can be precipitated in a particularly advantageous manner by adding phosphoric acid or calcium chloride mixed with potassium phosphates or sodium phosphates or calcium silicates.

According to variant (c) of process (A), the azulmic acids which are almost free from structural defects are treated with distilled water in the neutral range, preferably at pH values between 6 and 6.5, for 4 to 60 hours. The reaction temperatures can be varied within a substantial range in this procedure. In general, the reaction is carried out at temperatures between 60° C. and 150° C., preferably between 80° C. and 120° C. In general, the reaction is carried out under normal pressure. However, it is also possible to carry it out under increased pressure. Isolation of the reaction products is also carried out by customary methods in this variant of process (A). In general, a procedure is followed in which, after the reaction has ended, the reaction mixture is filtered and the solid product obtained is dried.

According to variant (d) of process (A), the azulmic acids which are almost free from structural defects are treated with vegetable ashes, catalytically active naturally occurring substances and/or fertilizers.

Possible vegetable ashes in this procedure are the combustion products of the most diverse substances formed by photosynthesis. Preferred ashes which may be mentioned are the ashes of fir, broom, Serbian spruce, oak, straw, brich, beech, willow, tobacco leaves and tobacco stalks, and furthermore of cereals, such as rye or barley, and also of fungi, for example edible mushrooms, and of apples, carrots, potato tubers and leaves of white cabbage. It is particularly advantageous to use potassium-rich varieties of ash. By ashes there are also to be understood here mixtures of various vegetable ashes.

Preferred possible catalytically active naturally occurring substances are biologically active garden mold and basic or acid soils of the most diverse nature.

All the commercially available fertilizers can be used as fertilizers in the production of structural defects according to variant (d) of process (A). Preferred fertilizers which may be mentioned are varieties of peat charged with plant nutrients, superphosphate, basic slag, Rhenania phosphate, phosphorite, calcium cyanamide, calcium ammonium nitrate, Leuna saltpeter, potassium phosphates, potassium nitrate and ammonium nitrate.

Variant (d) of process (A) is carried out in an aqueous medium, preferably in water. However, it is also possible to replace some of the water by other diluents, such as hydrogen sulphide or alcohols, methanol and ethanol being mentioned in particular.

The reaction temperatures can be varied within a substantial range in the case of variant (d) of process (A). In general, the reaction is carried out between 50° C. and 150° C., preferably between 80° C. and 120° C.

In general, the reactions according to variant (d) of process (A) are carried out under normal pressure. However, it is also possible to carry out the reactions under increased pressure.

In carrying out variant (d) of process (A), the azulmic acid is reacted with catalytic, or even with larger amounts, of vegetable ashes, catalytically active naturally occurring substances and/or fertilizers. If the vegetable ashes, catalytically active naturally occurring substances and/or fertilizers are used in a relatively large amount, these substances are not only used for producing structural defects, but they are also simultaneously contained, as additives, in the products formed. The mixture is worked up by customary methods. In general, a procedure is followed in which, after the reaction has ended, the reaction mixture is filtered and the solid product obtained is appropriately washed and dried.

According to variant (e) of process (A), the azulmic acids which are almost free from structural defects are treated with metal compounds, optionally in the presence of oxidizing agents and optionally in the presence of organic acids.

Preferred possible metal compounds here are salts of metals of main groups II to V or of sub-groups I to VIII. Examples which may be mentioned are calcium chloride, acetate and nitrate, strontium nitrate, barium chloride and acetate, aluminum acetate and formate, thallium sulphate and nitrate, silicon tetrachloride, sodium silicate and potassium silicate, tin-II chloride, lead-II chloride, acetate and nitrate, bismuth-III nitrate, copper sulphate, nitrate and acetate, silver nitrate, aurichlorohydric acid, zinc chloride and acetate, cadmium chloride, mercury-II chloride, titanium tetrachloride and tetrabutylate, zirconium sulphate, chromium-III chloride, manganese-II sulphate and acetate, iron-II sulphate and acetate and iron-III chloride, cobalt chloride, nickel chloride, hexachloroplatinic acid and palladium-II chloride. Further metal compounds which can preferably be used are the acids of vanadium, molybdenum and tungsten, and hetero-polyacids thereof.

Possible oxidizing agents which can be present in carrying out variant (e) of process (A) are all the customary agents which release oxygen. Air and nitric acid, hypochlorous acid, perchloric acid, calcium hypochlorite and hydrogen peroxide can preferably be used.

Preferred possible organic acids which can be present in carrying out variant (e) of process (A) are saturated and unsaturated optionally substituted carboxylic acids. Formic acids, acetic acid, propionic acid, 2-ethylcaproic acid, acrylic acid, methacrylic acid, oleic acid, ricinoleic acid, chloroacetic acid, dichloroacetic acid, trichloroacetic acid and hydroxyacetic acid may be mentioned in particular.

In general, variant (e) of process (A) is carried out in an aqueous medium, preferably in water. However, it is also possible to replace some of the water by other diluents, such as acids or organic hydrocarbons, formic acid and xylene being mentioned in particular.

The reaction temperatures can be varied within a substantial range in the case of variant (e) of process (A). In general, the reaction is carried out between 0° C. and 150° C., preferably between 20° C. and 120° C.

In general, the reaction according to variant (e) of process (A) is carried out under normal pressure. However, it is also possible to carry out the reaction under increased pressure.

In carrying out variant (e) of process (A), a catalytic amount, or even a larger amoun—about 1 to 2 mols—of metal compound and optionally a catalytic amount, or even a larger amount, of oxidizing agent and optionally a catalytic amount, or even a larger amount, of organic acid are employed per 1 mol (relative to the molecular unit

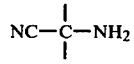

with the equivalent weight 54) of azulmic acid. The mixture is worked up by customary methods. In general, a procedure is followed in which, after the reaction has ended, the reaction mixture is filtered and the solid product thereby obtained is appropriately washed and dried.

Any excess metal compounds present in the products obtained can be precipitated in the form of finely divided precipitates, which are frequently sparingly soluble, by adding bases, such as ammonia, sodium hydroxide or potassium hydroxide, or by adding acids, such as phosphoric acid, depending on the metal compound.

According to variant (f) of process (A), the azulmic acids which are almost free from structural defects are treated with metal salt conplexes of azulmic acids stabilized with carbonyl compounds.

The preparation of the metal salt complexes, required as starting materials, of azulmic acids stabilized with carbonyl compounds is described in connection with the preparation of the substances according to the invention (compare page 44).

Metal salt complexes which can preferably be used in this procedure are those which are derived from those metal compounds which have already been mentioned as preferred in connection with variant (e) of process (A).

Variant (f) of process (A) is carried out in an aqueous medium, preferably in water. However, it is also possible to replace some of the water by other diluents, such as alcohols.

The reaction temperatures can be varied within a substantial range in the case of variant (f) of process (A). In general, the reaction is carried out between 0° C. and 150° C., preferably between 20° C. and 120° C.

In general, the reaction according to variant (f) of process (A) is carried out under normal pressure. However, it is also possible to carry out the reaction under increased pressure.

In carrying out variant (f) of process (A), 0.5 to 1 mol of metal salt complex of stabilized azulmic acid is preferably employed per 1 mol (relative to the molecular unit

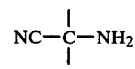

with the equivalent weight 54) of azulmic acid which is almost free from structural defects. The mixture is worked up by customary methods. In general, a procedure is followed in which, after the reaction has ended, the reaction mixture is filtered and the solid product thus obtained is appropriately washed and dried.

Any excess metal compounds present in the products which can be prepared according to variant (f) of process (A) can be precipitated in the form of finely divided precipitates, which are frequently sparingly soluble, by adding bases, such as ammonia, sodium hydroxide or potassium hydroxide, or by adding acids, such as phosphoric acid, depending on the metal compound.

According to variant (g) of process (A), the azulmic acids which are almost free from structural defects are treated with oxidizing agents. Possible oxidizing agents here are all the customary reagents having an oxidizing action. Air, oxygen, potassium permanganate, hydrogen peroxide, chromic acid and bleaching powder can preferably be used.

Variant (g) of process (A) is carried out in an aqueous medium, preferably in water. However, it is also possible to replace some of the water by other diluents, such as organic carboxylic acids, formic acid and acetic acid being mentioned in particular.

The reaction temperatures can be varied within a substantial range in the case of variant (g) of process (A). In general, the reaction is carried out between 0° C. and 150° C., preferably between 20° C. and 120° C.

In general, the reaction according to variant (g) of process (A) is carried out under normal pressure. However, it is also possible to carry out the reaction under increased pressure.

In carrying out variant (g) of process (A), a catalytic amount, or even a larger, optionally equimolar, amount, of oxidizing agent is employed per 1 mol (relative to the molecular unit

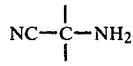

with the equivalent weight 54) of azulmic acid which is almost free from structural defects. The mixture is worked up by customary methods. In general, a procedure is followed in which, after the reaction has ended, the reaction mixture is filtered and the solid product obtained is appropriately washed and dried.

According to process (B), monomeric aqueous hydrocyanic acid is polymerized under hydrolyzing conditions with the aid of basic catalysts, optionally in the presence of additives. Dilute aqueous hydrocyanic acid solutions are used as starting materials in this procedure. In general, solutions with a hydrocyanic acid concentration of between 10 and 30%, preferably between 15 and 25%, are used.

Possible basic catalysts for process (B) are organic and inorganic bases and basic salts of the most diverse nature. Alkali metal cyanides and alkali metal cyanates, such as sodium cyanide, potassium cyanide, sodium cyanate and potassium cyanate, and furthermore amines and ammonia, can preferably be used. Mixtures of the most diverse bases or basic salts can also advantageously be employed; a mixture of sodium cyanate and aqueous ammonia solution may be mentioned as an example.

Naturally occurring organic substances and products obtained therefrom, naturally occurring inorganic substances and products obtained therefrom, synthetic organic products, synthetic inorganic products and/or mixed products consisting of organic and inorganic products can be used as additives in carrying out process (B). These include, preferably, all those materials which have already been mentioned as preferred in connection with the description of the additives optionally present in the substances according to the invention.

Process (B) is carried out in an aqueous medium, preferably in water. However, it is also possible to replace some of the water by other diluents, such as hydrogen sulphide or alcohols, methanol and ethanol being mentioned in particular.

The reaction temperatures can be varied within a particular range in the case of process (B), it being necessary, however, for the temperature setting to be adjusted according to the particular reaction phase. In general, the procedure is to first carry out the polymerization at temperatures between 30° C. and 70° C., preferably between 40° C. and 60° C., for 1 to 4 hours so that an approximately 60% conversion of the monomeric hydrocyanic acid is achieved. Thereafter, the polymerization is carried out at temperatures between 70° C. and 95° C., preferably between 80° C. and 90° C., for a further 4 to 10 hours, whereupon a conversion of about 90 to 95% is achieved. The mixture can then be heated to temperatures of about 100° C. for several hours in order to bring the reaction to completion and to remove hydrocyanic acid still present and any volatile amines or ammonia present.

In general, the reaction according to process (B) is carried out under normal pressure. However, it is also possible to carry out the reaction under increased pressure at temperatures between 120° C. and 150° C. In this procedure, relatively large amounts of structural defects can be produced in the process products in a controlled manner.

In carrying out process (B), the basic catalyst is employed in an amount such that its proportion is 1 to 15%, preferably 2 to 10%, of the monomeric hydrocyanic acid employed.

The additives are optionally added to the reaction mixture in an amount such that their proportion in the end product is between 1 and 95 percent by weight, preferably between 5 and 90 percent by weight. The mixture is worked up by customary methods. In general, a procedure is followed in which, after removing excess hydrocyanic acid and any volatile amines or ammonia present, the reaction mixture is filtered and the solid product thereby obtained is appropriately washed and dried.

Carbonyl compounds are also employed as starting compounds in process (1) according to the invention. Possible carbonyl compounds here are all compounds with reactive carbonyl groups. These include, preferably, aldehydes, ketones and keto esters.

Aldehydes which can particularly preferably be used are formaldehyde, acetaldehyde, hydroxyacetaldehyde, isobutyraldehyde, chloral, hydroxyethylaldehyde, hydroxypivalaldehyde, acrolein, crotonaldehyde, glyoxal, methylglyoxal, furfurol, hydroxymethylfurfurol, glucose, salicylaldehyde and glyceraldehyde.

Furthermore, it is also possible to use, in particular, those compounds which release aldehydes, such as, for example, formaldehyde, under the reaction conditions. These compounds include, preferably, paraformaldehyde, trioxane, trithione, chloral hydrate and hemiacetals of formaldehyde, for example, those which are derived from ethylene glycol, diethylene glycol, glycerol, methanol, ethanol and propanol.

Moreover, it is also possible to use, in particular, those aldehydes or aldehyde derivatives which are produced in situ from formaldehyde under the conditions of the synthesis of formose sugar mixtures. In the present case, a procedure is followed in which modified azulmic acids which are charged with calcium hydroxide, lead hydroxide or other suitable catalysts or which contain catalytically active substances bonded as complexes, are allowed to act on formaldehyde. In this procedure, formaldehyde is converted, in a rapid reaction, into $C_2$-, $C_3$-, $C_4$-, $C_5$- and $C_6$- aldehydes, such as hydroxyacetaldehyde, glyceraldehyde and aldehydes, containing hydroxyl groups, of higher functionality or polyhydroxyketones, which undergo stabilizing condensation reactions in situ with amino groups of the azulmic acids.

Dihydroxyacetone and cyclohexanone may be mentioned in particular as ketones which can preferably be used, and ethyl acetoacetate may be mentioned as an example of a keto ester which can preferably be used.

Naturally occurring organic substances and products obtained therefrom, naturally occurring inorganic substances and products obtained therefrom, synthetic organic products, synthetic inorganic products and/or mixed products consisting of organic and inorganic products can be used as additives in carrying out process (1) according to the invention. These additives include, preferably, all those materials which have already been mentioned as preferred in connection with the description of the additives optionally present in the substances according to the invention.

Process (1) according to the invention is carried out in an aqueous medium or in an aqueous-alcoholic medium. A preferred possible reaction medium is water, or a mixture of water and an alcohol, such as methanol or ethanol.

The condensation reaction in process (1) according to the invention is carried out under acid, neutral or basic conditions.

The reaction temperatures can be varied within a substantial range in the case of process (1) according to the invention. In general, the reaction is carried out at temperatures between 10° C. and 250° C., preferably between 50° C. and 150° C.

In general, the reaction in process (1) according to the invention is carried out under normal pressure. However, it is also possible to carry out the reaction under increased pressure.

In carrying out process (1) according to the invention, 0.05 to 6 mols, preferably 0.2 to 3 mols, of carbonyl compound, a catalytic amount, or even a larger amount, of acid or base (about 1 mol of acid or base per 100 parts of azulmic acid) and optionally an amount of additives such that their proportion in the end product is between 1 and 95 percent by weight are employed per 1 mol (relative to the molecular unit

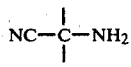

with the equivalent weight 54) of modified azulmic acid optionally containing additives. The mixture is worked up by customary methods. In general, a procedure is followed in which, after the reaction has ended, the reaction mixture is filtered and the solid product obtained is appropriately washed and dried.

In this connection it should be pointed out that even very small amounts of carbonyl compounds (0.05 to 0.2 mol) are frequently sufficient to obtain substances which have a high stability towards the splitting off of hydrogen cyanide under the influence of heat and under hydrolysis conditions.

If carbonyl compounds such as crotonaldehyde, cyclohexanone or ethyl acetoacetate are used for the condensation reaction according to the invention, as a result of the fairly large cross-section of the molecules of these agents, the rate of conversion which can be achieved with these topochemical reactions is slower than when compounds with molecules of smaller cross-section are used. In these cases, relatively long reaction times (more than 30 hours) and relatively high reaction temperatures are therefore necessary to achieve adequate stabilizing.

In process (2) according to the invention, acid addition salts or complex compounds, optionally containing additives, of modified azulmic acids containing from 0.5 to 55 percent by weight of ionic groups of the formula

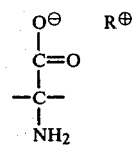

and containing from 0.5 to 15 percent by weight of groups of the formula

are subjected to a condensation reaction with carbonyl compounds in an aqueous medium, optionally in the presence of additives.

In the formula (F₁), R preferably represents those substituents which have already been mentioned as preferred for R in connection with the description of the substances according to the invention.

The acid addition salts or complex compounds of modified azulmic acids (=azulmic acids containing structural defects) to be used as starting materials in process (2) according to the invention can contain 1 to 95 percent by weight, preferably 5 to 90 percent by weight, of additives. Possible additives here are naturally occurring organic substances and products obtained therefrom, naturally occurring inorganic substances and products obtained therefrom, synthetic organic products, synthetic inorganic products and/or mixed products consisting of organic and inorganic products. These additives include, preferably, all those materials which have already been mentioned as preferred in connection with the description of the additives optionally present in the substances according to the invention.

Preferred possible acids which the acid addition salts, required as starting materials, of modified azulmic acids can contain, are all those acids which have already been mentioned in connection with the description of the substances according to the invention. Formic acid, nitric acid, phosphoric acid, phosphorous acid, chloroacetic acid, dichloroacetic acid, trichloroacetic acid and hydrofluoric acid may be mentioned in particular.

Preferred possible salts which the complex compounds, required as starting materials, of modified azulmic acids can contain bonded as complexes are all those ammonium salts and metal compounds which have already been mentioned as preferred in connection with the description of the substances according to the invention. Iron-II acetate, iron-II sulphate, iron-III sulphate, copper acetate, zinc acetate, manganese-II acetate, cobalt chloride, zinc chloride and tin-II chloride may be mentioned in particular.

The acid addition salts, which can be used as starting materials, of modified azulmic acids are not yet known. However, they can be prepared by a process in which the modified azulmic acids, optionally containing additives, accessible by processes (A) or (B) are stirred with the particular acid in an aqueous medium at room temperature or at elevated temperature. The reaction products are isolated by filtration. The preparation of some acid addition salts of modified azulmic acids has already been disclosed generally in connection with the description of the preparation of modified azulmic acids.

The complex compounds, which can also be used as starting materials in process (2) according to the invention, of modified azulmic acids are not yet known. However, they can be prepared by a process in which the modified azulmic acids, optionally containing additives, accessible by processes (A) or (B) are stirred in an aqueous medium at temperatures between 20° C. and 120° C., preferably at 50° C. to 110° C. The mixture is worked up by customary methods. In general, the reaction products are isolated by filtration. The preparation of some complex compounds of modified azulmic acids has already been disclosed generally in connection with the description of the preparation of modified azulmic acids.

Possible carbonyl compounds in carrying out process (2) according to the invention are all the customary compounds with reactive carbonyl groups. These include, preferably, aldehydes, ketones and keto esters. All those aldehydes, substances which release an aldehyde, ketones and keto esters which have already been mentioned in particular in connection with the description of process (1) according to the invention are particularly preferred.

Naturally occurring organic substances and products obtained therefrom, naturally occurring inorganic substances and products obtained therefrom, synthetic organic products, synthetic inorganic products and/or mixed products consisting of organic and inorganic products can be used as additives in carrying out process (2) according to the invention. These additives include, preferably, all those materials which have already been mentioned as preferred in connection with the description of the additives optionally present in the substances according to the invention.

Process (2) according to the invention is carried out in an aqueous medium or in an aqueous-alcoholic medium. A preferred possible reaction medium is water, or a mixture of water and an alcohol, such as methanol or ethanol.

The condensation reaction in process (2) according to the invention is carried out under acid, neutral or basic conditions.

The reaction temperatures can be varied within a substantial range in the case of process (2) according to the invention. In general, the reaction is carried out at temperatures between 10° C. and 250° C., preferably between 50° C. and 150° C.

In general, the reaction in process (2) according to the invention is carried out under normal pressure. However, it is also possible to carry out the reaction under increased pressure.

In carrying out process (2) according to the invention, 0.05 to 6 mols, preferably 0.2 to 3 mols, of carbonyl compound, a catalytic amount, or even a larger amount, of acid or base (about 1 mol of acid or base per 100 parts by weight of azulmic acid) and optionally an amount of additives such that their proportion in the end product is between 1 and 95 percent by weight, preferably between 5 and 90 percent by weight, are employed per 1 mol (relative to the molecular unit

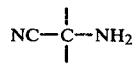

with the equivalent weight 54) of acid addition salts or complex compounds, optionally containing additives, of modified azulmic acid. The mixture is worked up by customary methods. In general, a procedure is followed in which, after the reaction has ended, the reaction mixture is filtered and the solid product obtained is appropriately washed and dried.

A small amount of carbonyl compounds (0.05 to 0.2 mol) is also frequently sufficient in carrying out process (2) according to the invention to obtain substances which have a high stability towards the splitting off of hydrogen cyanide under the influence of heat and under hydrolysis conditions.

According to process (3) according to the invention, azulmic acids which are almost free from structural defects are subjected to a condensation reaction with carbonyl compounds in an aqueous medium, optionally in the presence of additives.

The azulmic acids which are almost free from structural defects and are required as starting materials are known (compare Houben-Weyl, volume 8 (1952), page 261; German Patent Specification No. 662,338 and German Patent Specification No. 949,060.

Possible carbonyl compounds for carrying out process (3) according to the invention are again all the customary compounds with reactive carbonyl groups. These include, preferably, aldehydes, ketones and keto esters. All those aldehydes, substances which release an aldehyde, ketones and keto esters which have already been mentioned in particular in connection with the description of process (1) according to the invention are particularly preferred.

Naturally occurring organic substances and products obtained therefrom, naturally occurring inorganic substances and products obtained therefrom, synthetic organic products, synthetic inorganic products and/or mixed products consisting of organic and inorganic products can be used as additives in carrying out process (3) according to the invention. These additives include, preferably, all those materials which have already been mentioned as preferred in connection with the description of the additives optionally present in the substances according to the invention.

Process (3) according to the invention is carried out in an aqueous medium or in an aqueous-alcoholic medium. A preferred possible reaction medium is water, or a mixture of water and an alcohol, such as methanol or ethanol.

The condensation reaction in process (3) according to the invention is carried out under acid, neutral or basic conditions.

The reaction temperatures can be varied within a substantial range in the case of process (3) according to the invention. In general, the reaction is carried out at temperatures between 10° C. and 250° C., preferably between 50° C. and 150° C.

In general, the reaction in process (3) according to the invention is carried out under normal pressure. However, it is also possible to carry out the reaction under increased pressure.

In carrying out process (3) according to the invention, 0.05 to 6 mols, preferably 0.2 to 3 mols, of carbonyl compound, optionally a catalytic amount, or even a larger amount, of acid or base and optionally an amount of additives such that their proportion in the end product is between 1 and 95 percent by weight, preferably between 5 and 90 percent by weight, are employed per 1 mol (relative to the molecular unit

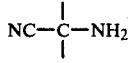

with the equivalent weight 54) of azulmic acid which is almost free from structural defects. The mixture is worked up by customary methods. In general, a procedure is followed in which, after the reaction has ended, the reaction mixture is filtered and the solid product obtained is appropriately washed and dried.

A small amount of carbonyl compounds (0.05 to 0.2 mol) is also frequently sufficient in carrying out process (3) according to the invention to obtain substances which have a high stability towards the splitting off of hydrogen cyanide under the influence of heat and under hydrolysis conditions.

In process (4) according to the invention, hydrocyanic acid is polymerized under hydrolyzing conditions in an aqueous medium with the aid of basic catalysts, optionally in the presence of additives, and the reaction products are then subjected to a condensation reaction with carbonyl compounds, without prior isolation, in an aqueous medium, optionally in the presence of additives.

Dilute aqueous hydrocyanic acid solutions, to which additives are optionally admixed, are used as starting materials in this procedure. In general, solutions with a hydrocyanic acid concentration of between 10 and 30%, preferably between 15 and 25%, are used.

Possible basic catalysts for process (4) according to the invention are organic and inorganic bases and basic salts of the most diverse nature. All those bases or salts which have already been mentioned as preferred in connection with the description of process (B) can preferably be used here. Mixtures of the most diverse bases or basic salts can also advantageously be employed; a mixture of sodium cyanate and aqueous ammonia solution may be mentioned in particular.

Possible additives which can be added to the reaction mixture before and/or after the hydrocyanic acid polymerization are again naturally occurring organic substances and products obtained therefrom, naturally occurring inorganic substances and products obtained therefrom, synthetic organic products, synthetic inorganic products and/or mixed products consisting of organic and inorganic products. These additives include, preferably, all those materials which have already been mentioned as preferred in connection with the description of the additives optionally present in the substances according to the invention.

Possible carbonyl compounds which, in the case of process (4) according to the invention, are added to the reaction mixture after the hydrocyanic acid polymerization are again all the customary compounds with reactive carbonyl groups. These include, preferably, aldehydes, ketones and keto esters. All those aldehydes, substances which release an aldehyde, ketones and keto esters which have already been mentioned in particular in connection with the description of process (1) according to the invention are particularly preferred.

Process (4) according to the invention is carried out in an aqueous medium, preferably in water. However, it is also possible to replace some of the water by other diluents, such as hydrogen sulphide or alcohols, methanol and ethanol being mentioned in particular.

The reaction temperatures can be varied within a particular range in the case of process (4) according to the invention, it being necessary, however, for the temperature setting to be adjusted according to the particular reaction phase. In general, the procedure is to first carry out the polymerization at temperatures between 30° C. and 70° C., preferably between 40° C. and 60° C., for 1 to 4 hours, so that an approximately 60% conversion of the monomeric hydrocyanic acid is achieved. Thereafter, polymerization is carried out at temperatures between 70° C. and 95° C., preferably between 80° C. and 90° C., for a further 4 to 10 hours, whereupon a conversion of about 90 to 95% is achieved. The mixture can then be heated to temperatures of about 100° C. for several hours in order to bring the reaction to completion and to remove hydrocyanic acid still present and any volatile amines or ammonia present. Thereafter, the condensation reaction with carbonyl compounds is carried out at the temperatures customary for this reaction. In general, the reaction is carried out at temperatures between 10° C. and 250° C., preferably between 50° C. and 150° C.

In general, the reaction in process (4) according to the invention is carried out under normal pressure. However, it is also possible to carry out the reaction under increased pressure at temperatures between 120° C. and 150° C. In this procedure, relatively large amounts of structural defects can be produced in the process products in a controlled manner.

In carrying out process (4) according to the invention, the basic catalyst is employed in an amount such that its proportion is 1 to 15%, preferably 2 to 10%, of the monomeric hydrocyanic acid employed. The amount of carbonyl compounds is chosen so that 0.05 to 6 mols, preferably 0.2 to 3 mols, of carbonyl compound are present per mol (relative to the molecular unit

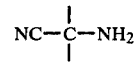

with the equivalent weight 54) of azulmic acid formed. The additives are optionally added to the reaction mixture in an amount such that their proportion in the end product is between 1 and 95 percent by weight, preferably between 5 and 90 percent by weight. The mixture is worked up by customary methods. In general, a procedure is followed in which, after removing excess hydrocyanic acid and any volatile amines or ammonia present, the reaction mixture is filtered and the solid product thereby obtained is appropriately washed and dried.

In process (5) according to the invention, modified azulmic acids are first reacted with bases in an aqueous medium and the products are then optionally treated with metal salts and subsequently subjected to a condensation reaction with carbonyl compounds, optionally in the presence of additives.

Possible modified azulmic acids here are all those azulmic acids which contain structural defects and which can also be employed as starting materials in carrying out process (1) according to the invention.

Possible bases or basic salts in carrying out process (5) according to the invention are the most diverse inorganic or organic bases and basic salts. Alkali metal hydroxides, such as lithium hydroxide, sodium hydroxide and potassium hydroxide, alkali metal carbonates, such as sodium carbonate, potassium carbonate and potassium bicarbonate, alkali metal sulphides, such as sodium sulphide, potassium sulphide and potassium bisulphide, alkali metal thiosulphates, such as sodium thiosulphate, alkylamines and furthermore ammonium hydroxide and ammonium salts, such as ammonium polysulphides, can preferably be used.

Preferred possible metal salts in carrying out process (5) according to the invention are all those metal salts which have already been mentioned as preferred in connection with the description of variant (e) of process (A). Iron-II acetate, iron-II sulphate, iron-III sulphate, copper acetate, zinc acetate, manganese-II acetate, cobalt chloride, zinc chloride and tin-II chloride may be mentioned in particular.

Possible additives are again naturally occurring organic substances and products obtained therefrom, naturally occurring inorganic substances and products obtained therefrom, synthetic organic products, synthetic inorganic products and/or mixed products consisting of organic and inorganic products. These additives include, preferably, all those materials which have already been mentioned as preferred in connection with the description of the additives optionally present in the substances according to the invention.

Possible carbonyl compounds in the case of process (5) according to the invention are again all the customary compounds with reactive carbonyl groups. These include, preferably, aldehydes, ketones and keto esters. All those aldehydes, substances which release an aldehyde, ketones and keto esters which have already been mentioned in particular in connection with the description of process (1) according to the invention are particularly preferred.

Process (5) according to the invention is carried out in an aqueous medium, preferably in water. However, it is also possible to replace some of the water by other diluents, such as hydrogen sulphide or alcohols, methanol and ethanol being mentioned in particular.

The reaction temperatures can be varied within a substantial range in the case of process (5) according to the invention. In general, the reaction is first carried out at between 50° C. and 120° C., preferably between 60° C. and 110° C. Thereafter, the condensation reaction with carbonyl compounds is carried out at the temperatures customary for this reaction. In general, the reaction is carried out at temperatures between 10° C. and 250° C., preferably between 50° C. and 150° C.

In general, the reaction in process (5) according to the invention is carried out under normal pressure. However, it is also possible to carry out the reaction under increased pressure. The latter is advisable, in particular, if ammonium hydroxide or volatile amines are employed as the bases.

In carrying out process (5) according to the invention, 0.5 to 4 mols of base or basic salts, optionally 1 to 2 mols of metal salt, 0.05 to 6 mols, preferably 0.2 to 3 mols, of carbonyl compound and optionally an amount of additives such that their proportion in the end product is between 1 and 95 percent by weight, preferably between 5 and 90 percent by weight, are preferably employed per 1 mol (relative to the molecular unit

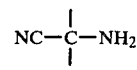

with the equivalent weight 54) of modified azulmic acid. The mixture is worked up by customary methods. In general, a procedure is followed in which, after the reaction has ended, the reaction mixture is filtered and the solid product obtained is appropriately washed and dried. However, a procedure is also possible in which the resulting dispersion is first concentrated, an alcohol, such as methanol, is then added, the mixture is again concentrated under reduced pressure and, after repeating this operation several times, the solid product thereby obtained is filtered off, washed and appropriately dried.

In process (6) according to the invention, modified azulmic acids are first treated with organic or inorganic acids in an aqueous medium and the products are then subjected to a condensation reaction with carbonyl compounds, optionally in the presence of additives.

Possible modified azulmic acids here are all those azulmic acids which contain structural defects and which can also be employed as starting materials in carrying out process (1) according to the invention.

Preferred possible inorganic or organic acids are all those acids which have already been listed as preferred in connection with the description of the products according to the invention.

Possible carbonyl compounds in carrying out process (6) according to the invention are again all the customary compounds with reactive carbonyl groups. These include, preferably, aldehydes, ketones and keto esters. All those aldehydes, substances which release an aldehyde, ketones and keto esters which have already been mentioned in particular in connection with the description of process (1) according to the invention are particularly preferred.

Naturally occurring organic substances and products obtained therefrom, naturally occurring inorganic substances and products obtained therefrom, synthetic organic products, synthetic inorganic products and/or mixed products consisting of organic and inorganic products can be used as additives in carrying out process (6) according to the invention. These additives include, preferably, all those materials which have already been mentioned as preferred in connection with the description of the additives optionally present in the substances according to the invention.

Process (6) according to the invention is carried out in an aqueous medium, preferably in water. However, it is also possible to replace some of the water by other diluents, such as alcohols, methanol and ethanol being mentioned in particular.

The reaction temperatures can be varied within a substantial range in the case of process (6) according to the invention. In general, the treatment of the azulmic acids with acids is carried out at temperatures between 0° C. and 200° C., preferably between 20° C. and 120° C. Thereafter, the condensation reaction with carbonyl compounds is carried out at the temperatures customary for this reaction. In general, the reaction is carried out at temperatures between 10° C. ad 250° C., preferably between 50° C. and 150° C.

In general, the reaction is process (6) according to the invention is carried out under normal pressure. However, it is also possible to carry out the reaction under increased pressure.

In carrying out process (6) according to the invention, a catalytic amount, or even a larger amount—preferably 1 to 4 mols—of inorganic or organic acid, 0.05 to 6 mols, preferably 0.2 to 3 mols, of carbonyl compound and optionally an amount of additives such that their proportion in the end product is between 1 and 95 percent by weight, preferably between 5 and 90 percent by weight, are employed per 1 mol (relative to the molecular unit

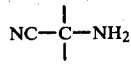

with the equivalent weight 54) of modified azulmic acid. The mixture is worked up by customary methods. In general, a procedure is followed in which, after the reaction has ended, the reaction mixture is filtered and the solid product obtained is appropriately washed and dried. Any excess acid still present in the products thus formed can be converted into the corresponding ammonium salts by gassing with ammonia, the reaction advantageously being carried out in the solid phase in a fluidized bed.

In process (7) according to the invention, azulmic acids which are almost free from structural defects are subjected to a condensation reaction with carbonyl compounds in an aqueous medium, in the presence of hydrolytically degradable naturally occurring substances and in the presence of an acid.

Possible hydrolytically degradable naturally occurring substances here are all those naturally occurring substances which are completely or partially degraded under the influence of an acid. These include, preferably, celluloses, hemicelluloses, sugars, lignin, polymeric quinones, wood flour, vegetable material polypeptides, such as gelatin and wool, and furthermore yeast proteins, algal compositions and peat compositions.

Possible acids are all the sufficiently strong organic or inorganic acids. Phosphoric acid and phosphorous acid can be preferably used.

Possible carbonyl compounds in carrying out process (7) according to the invention are again all the customary compounds with reactive carbonyl groups. These include, preferably, aldehydes, ketones and keto esters. All those aldehydes, substances which release an aldehyde, ketones and keto esters which have already been mentioned in particular in connection with the description of process (1) according to the invention are particularly preferred.

Process (7) according to the invention is carried out in an aqueous medium, preferably in water. However, it is also possible to replace some of the water by other diluents, such as alcohols, methanol and ethanol being mentioned in particular.

The reaction temperatures can be varied within a substantial range in carrying out process (7) according to the invention. In general, the reaction is carried out at temperatures between 10° C. and 250° C., preferably between 50° C. and 150° C.

In general, the reaction in process (7) according to the invention is carried out under normal pressure. However, it is also possible to carry out the reaction under increased pressure.

In carrying out process (7) according to the invention, a catalytic amount, or even a larger amount—preferably 1 to 4 mols—of inorganic or organic acid, 0.05 to 6 mols, preferably 0.2 to 3 mols, of carbonyl compound and an amount of hydrolytically degradable naturally occurring substances such that their proportion in the end product is between 1 and 95 percent by weight, preferably between 5 and 90 percent by weight, are preferably placed on 1 mol (relative to the molecular unit

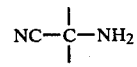

with the equivalent weight 54) of azulmic acid. In this procedure, structural defects are produced with simultaneous hydrolytic degradation of the particular naturally occurring substances employed and with simultaneous stabilizing of the azulmic acids by condensation with carbonyl compounds. If 0.2 to 80% strength phosphoric acid or phosphorous acid and polypeptides are used, the latter are split into aminoacid mixtures.

Because of its numerous amino groups, the azulmic acid bonds about 0.3 to 0.4 mol of acid, for example phosphoric acid or phosphorous acid, while the phosphoric acid salts of the aminoacids or those of the oligopolypeptides, or the other low-molecular degradation products of the naturally occurring substance employed are frequently fixed by the azulmic acid matrix in a large amount, even when they are water-soluble. Excess acid, for example phosphoric acid, can be precipitated on the azulmic acid matrix as calcium phosphate by adding calcium hydroxide. If hydrolyzed sugars and oligosaccharides are present in this case, they are fixed on the azulmic acid in the form of their calcium complexes, which are usually sparingly soluble. The process products obtained by this process can be stored for a relatively long period without unpleasant odors being formed, as is otherwise the case when naturally occurring substances such as oligopeptides, peptide/sugar mixtures and the like are degraded by biological processes.

Isolation of the process products is carried out by customary methods, in general by filtration.

If free amino groups are still present in the products prepared by processes (1) to (7) according to the invention, these products can be converted into the corresponding acid addition salts by treatment with inorganic or organic acids. In this case, a procedure is followed in which the products are stirred with the particular acid in an aqueous medium, optionally at elevated temperature. The reaction products are isolated by filtration.

If free carboxyl groups are still present in the products prepared by processes (1) to (7) according to the invention, these products can be converted into the corresponding salts by treatment with bases. In this case, a procedure is followed in which the products are stirred with the particular base in an aqueous medium, optionally at elevated temperature. The reaction products are isolated by filtration.

Furthermore, products according to the invention can also be converted into complex compounds. In this case, a procedure is followed in which the products are stirred with a metal salt in an aqueous medium, optionally at elevated temperature. The reaction products are isolated by filtration.

The processes according to the invention can be carried out according to a number of specific variants. Thus, a preferred embodiment of process (1) according to the invention consists of a procedure in which structural defects are produced in azulmic acid which is almost free from structural defects using nitric acid according to variant (a) of process (A), the reaction temperature being kept relatively low, preferably between 20° C. and 30° C., during this procedure, and the modified azulmic acids thereby formed in a topochemical reaction, in which 30 to 50% of the amino groups present are in the form of ionic groups of the formula

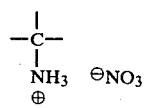

are subjected to a condensation reaction with carbonyl compounds, if appropriate after prior gassing with ammonia, in an aqueous medium. The gassing with ammonia, in which traces of free nitric acid are converted into ammonium nitrate, is appropriately carried out in the solid phase in a fluidized bed.

A further preferred embodiment of process (1) according to the invention consists of a procedure in which structural defects are produced in azulmic acid which is almost free from structural defects using phosphoric acid or phosphorous acid according to variant (a) of process (A), the reaction temperature being kept relatively low, preferably between 20° C. and 55° C., during this procedure, and the modified azulmic acids thereby formed in a topchemical reaction, which have only a few $F_2$ structural defects and which contain phosphoric acid or phosphorous acid bonded in the form of a salt, are subjected to a condensation reaction with carbonyl compounds, if appropriate after prior gassing with ammonia. The gassing with ammonia is again appropriately carried out in the solid phase in a fluidized bed.

A preferred embodiment of process (1) according to the invention consists of a procedure in which structural defects are produced in azulmic acid which is almost free from structural defects using 1 to 4 mols of 1 molar phosphoric acid, the excess phosphoric acid is then precipitated as calcium phosphate by adding calcium chloride, as magnesium phosphate by adding magnesium chloride or as ammonium magnesium phosphate by adding ammonia and magnesium salts, and thereafter the reaction product is subjected to a condensation reaction with carbonyl compounds, optionally in the presence of additives. Particularly preferred additives in this case are vegetable ashes, insoluble polyquinones, addition products and condensation products of benzoquinone with amines, in particular with ammonia, and furthermore lignin, lignin-sulphonic acid, humic acids, various fly ashes, bauxite, aluminum oxide, cobalt molybdate, silicon dioxide, active charcoal, zirconium dioxide, nickel oxide, palladium oxide and barium oxide. Furthermore, preferred possible additives are also sugars, such as cane sugar, and other sugars which contain no free aldehyde groups, or formose sugar mixtures prepared from formaldehyde. These most diverse types of sugars can be fixed in the channels and pores of the solid azulmic acid matrices. Moreover, the various sugars can also be absorbed onto the azulmic acids in the form of their calcium complexes, which are usually sparingly soluble.

A further embodiment of process (1) according to the invention consists of a procedure in which structural defects are produced in azulmic acids which are almost free from structural defects with the aid of strong bases, such as, for example, potassium hydroxide, according to variant (b) of process (A), relatively long reaction times being observed, and the modified azulmic acids thereby formed in a topochemical reaction, which have polyelectrolyte character, are subjected to a condensation reaction with carbonyl compounds, optionally in the presence of additives.

Another preferred embodiment of process (1) according to the invention consists of a procedure in which structural defects are produced in azulmic acids which are almost free from structural defects using gaseous ammonia under pressure in an aqueous-alcoholic medium at temperatures between 120° C. and 140° C., according to variant (b) of process (A), and the modified azulmic acids thereby formed in a topochemical reaction, which have a high content of ammonium carboxylate groups, are subjected to a condensation reaction with carbonyl compounds, optionally in the presence of additives.

Finally, a preferred embodiment of process (1) according to the invention consists of a procedure in which structural defects are produced in azulmic acids which are almost free from structural defects using waterglass according to variant (b) of process (A) and the modified azulmic acids, charged with potassium ions or sodium ions, thereby formed in a topochemical reaction, the saponifiable nitrile groups of which act as latent acids and precipitate silicic acids, are subjected to a condensation reaction with carbonyl compounds, optionally in the presence of additives. The silicic acids which have precipitated are absorbed, in fine distribution, onto the reaction products. Any excess sodium silicate or potassium silicate present can be precipitated by simple gassing of the particular dispersions with carbon dioxide, or can be precipitated in a particularly advantageous manner by adding phosphoric acid or calcium chloride mixed with potassium phosphates or sodium phosphates or calcium silicates.

Furthermore, a preferred embodiment of process (1) according to the invention consists of a procedure in which structural defects are produced in azulmic acids which are almost free from structural defects using 25% strength aqueous ammonia solution at room temperature in the course of 6 to 20 hours, according to variant (b) of process (A), and the modified azulmic acids, containing ammonium salts, thereby formed in a topochemical reaction are subjected to a condensation reaction with carbonyl compounds, optionally in the presence of additives.

It is frequently also appropriate to treat moist azulmic acids stabilized with carbonyl compounds and optionally containing additives with ammonia gas, with simultaneous gassing with carbon dioxide, structural defects being produced. Ammonia and carbon dioxide thereby penetrate into the azulmic acid matrix to a considerable extent as small molecules. In the case of gassing with ammonia in a fluidized bed, for example, the unstable ammonium carbaminates, ammonium bicarbonates and, if ammonia and carbon dioxide are introduced in the absence of water, ammonium carbamate of the formula

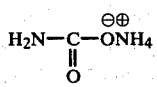

are obtained, fixed in the channels of the azulmic acid. In this form, the ammonium carbamate has a reduced liability to decompose at room temperature.

A further important embodiment of process (2) according to the invention consists of a procedure in which azulmic acid complexed with calcium hydroxide is reacted with sucrose, sugars, glucose or formose formulations which are prepared by condensation of formaldehyde with calcium hydroxide. If, for example, sucrose is used in this procedure, azulmic acids are formed which are charged with sucrose-calcium oxide complexes of the composition $3\ CaO \cdot C_{12}H_{22}O_{11}$.

If modified azulmic acids are employed as starting materials in the processes according to the invention, it is not absolutely necessary to isolate them after their preparation. Rather, it is by all means possible to first synthesize the modified azulmic acids and then directly to subject these to a condensation reaction with carbonyl compounds, without prior isolation.

In the case of the processes according to the invention, it is possible to carry out the production of structural defects and the simultaneous or subsequent condensation with carbonyl compounds not only in water but also in those hydrolyzing media in which some of the water has been replaced by hydrogen sulphide, or in which the water contains sodium sulphides, ammonium polysulphides or potassium bisulphide. If in such cases the process is carried out at temperatures between 70° C. and 100° C., small amounts of hydrocyanic acid split off are converted into carbon oxy-sulphide and ammonia, structural defects being produced at the same time.

The number of structural defects in the products according to the invention can optionally be increased by those methods which have already been described in connection with the preparation of modified azulmic acids.

It is frequently advantageous to treat the products according to the invention with bases after their preparation, in order, for example, to convert metal salts contained therein into metal hydroxides or oxides, or, for example, to allow aldehydes still contained therein to react completely. For this purpose, products according to the invention are preferably treated or gassed with ammonia or primary or secondary amines, or reacted with hydrazine hydrate, aqueous cyanamide solutions or aqueous ammonia solution. In the case of the action of ammonia, small amount of formaldehyde still contained in the products condensed with formaldehyde, for example, are converted into hexamethylenetetramine or hexahydrotriazines. An aftertreatment with 25% strength aqueous ammonia solution is frequently advisable.

As already mentioned, in the reactions according to the invention, even a relatively small amount of carbonyl compound is frequently sufficient to obtain products which are relatively stable towards the splitting off of hydrocyanic acid, both under the influence of heat and under hydrolysis conditions. If formaldehyde is used for the stabilizing, hydrocyanic acid thereby split off can be trapped particularly readily by the formation of water-soluble cyanohydrins from hydrocyanic acid and formaldehyde.

If a sufficient amount of carbonyl compounds is used for the stabilizing in the reactions according to the invention, products according to the invention are formed from which hydrogen cyanide is split off neither in the dry state nor in the moist state at room temperature or even at higher temperatures. This is shown, inter alia, by the fact that in contrast to azulmic acids which have not been stabilized, the products according to the invention are completely inert to standarized dried yeast formulations and in no way reduce the activity of the yeast during the alcoholic fermentation of cane sugar under mild conditions. Thus, the fermentation of cane sugar with standardized dry air in buffered aqueous solution at 35° C. is not impaired by azulmic acid, condensed with formaldehyde, simultaneously present, while a considerably retarded conversion of cane sugar is found when the same test is carried out in the presence of azulmic acids which have not been stabilized. Thus, in the last case, the yeast enzymes are so severely deactivated by the cyanide ions contained in the reaction mixture that the alcoholic fermentation is drastically inhibited.

The products according to the invention are not only very resistant towards the splitting off of hydrogen cyanide, but also have a considerably higher swellability than the previously known azulmic acids, which are almost free from structural defects. In contrast to the previously known azulmic acids, they therefore readily undergo very diverse chemical reactions and can thus be used in many ways.

Thus, the products according to the invention are outstandingly suitable as complex-forming agents for an exceptionally large number of metal salts, above all for heavy metal salts, and other metal compounds. The fixing of borate ions, iron ions, mercury ions, lead ions, cadmium ions, vanadate ions, tungstate ions, molybdate ions or anions of corresponding hetero-polyacids, and of pyrophosphates and higher-molecular, sparingly soluble, commercially available polyphosphates which are derived from polyphosphoric acids of the formula

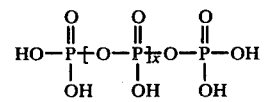

and have molecular weights between 6,000 and 40,000, onto the anchor groups of the stabilized azulmic acids may be mentioned as an example. The products concerned can be used as insoluble catalysts and as flame-proofing agents. The bonding of undesired heavy metal salts, such as mercury salts, in soil is also of importance.

Those stabilized azulmic acids according to the invention which contain from 2 to 30 percent by weight of compounds of potassium, sodium, lithium, manganese, lead, mercury, cobalt, tin, copper, zinc, iron-II, iron-III, bismuth, nickel and/or magnesium can be employed as completely insoluble catalysts in isocyanate chemistry. The course of an isocyanate trimerization reaction catalyzed in this manner can be illustrated by the equation which follows.

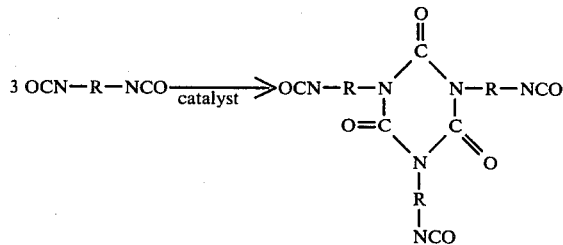

R = a bivalent aliphatic or aromatic radical catalyst- = azulmic acid stabilized with formaldehyde and charged with lithium ions, sodium ions, potassium ions and magnesium ions.

The course of the formation of a uret-dione catalyzed by metal salts of stabilized azulmic acids can be illustrated by the ideal equation which follows.

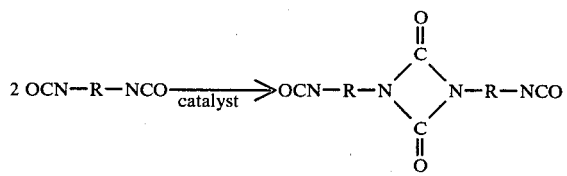

R = a bivalent aliphatic or aromatic radical catalyst- = azulmic acid stabilized with formaldehyde and charged with zinc ions, tin ions and mercury ions.

A particular advantage of these heterogeneous catalysts by stabilized azulmic acids containing metal salts is that the dimerization, polymerization or carbodiimide formation can be stopped by simple filtration of the mixtures, and the solutions of the polymers possessing isocyanate groups in monomeric polyisocyanates do not have to be deactivated. The products formed, described as modified isocyanates, have an outstanding stability on storage.

Products according to the invention can furthermore be employed for the preparation of dispersions in polyhydroxy compounds which can be foamed with isocyanates. Possible polyhydroxy compounds here are polyethers, polycarbonates, polyesters, polythioethers or polyacetals which have molecular weights of from 62 to about 10,000 and contain hydroxyl groups. Dispersions of this type can also be used in polyisocyanates which are of interest industrially and are preferably liquid at room temperature—for example toluylene-diisocyanates or liquid polyisocyanates which are obtained by phosgenation of aniline/formaldehyde condensates—for the preparation of polyurethane foams.

Products according to the invention are also used as multi-component fillers with reactive groups in plastics of the most diverse nature. It is possible, for example, to prepare, from the substances according to the invention and polycarbodiimide powders, products in which the stabilized azulmic acids are coated, microencapsulated and essentially enclosed by lamination by polycarbodiimides.

Those substances according to the invention which have a high ionic constituent and thus have a polyelectrolyte character can be used as ion exchangers or also as catalysts and catalyst supports. Potassium salts of azulmic acid, stabilized by formaldehyde, may be mentioned as examples in this connection.

Numerous substances according to the invention can be used as flameproofing agents or anti-ageing agents for preventing oxidative degradation in the most diverse polyurethane plastics, vinyl polymers, polyamide plastics, rubbers and epoxide resins. Those substances according to the invention which contain phosphoric acid, phosphorous acid, polymethyleneureas, polymethylenemelamines, calcium phosphates, aluminum phosphates, aluminum silicates, hydrated aluminum oxide, waterglass, melamine phosphate, barium phosphates, ammonium magnesium phosphates and urea oxalate are particularly suitable for this purpose.

Moreover, adducts of stabilized azulmic acids with compounds such as, for example, phospholine oxide-phosphonic acids of the formula

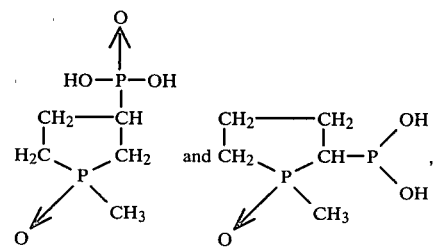

are suitable as catalysts for the heterogeneous catalysis of the reaction of isocyanates and polyisocyanates to give polycarbodiimides and their further adducts with isocyanates, that is to say uretoneimine-polyisocyanates.

Substances according to the invention can furthermore be employed as supports for numerous catalysts, mixed catalysts being formed which can be used in many ways. Thus, for example, azulmic acids stabilized with carbonyl compounds, in particular formaldehyde, and containing calcium hydroxide, lead acetate, lead hydroxide or bismuth hydroxide, have a high activity hitherto unknown for the synthesis of formose sugar mixtures. These mixed catalysts make it possible to convert formalin solutions of high strength into sugar mixtures, very high yields being achieved and Cannizarro reactions being essentially avoided.

Those azulmic acids which have been partially condensed (only about every fourth amino group, in statistical distribution) with carbonyl compounds, in particular formaldehyde, and contain 10 to 90 percent by weight, preferably 40 to 60 percent by weight, of calcium hydroxide are particularly suitable for the synthesis of formose. Substances of this type cause glycolaldehyde ($C_2$-aldehyde), glyceraldehyde ($C_3$-aldehyde) and further $C_4$–$C_7$-hydroxaldehydes or hydroxyketones, which can react with remaining amino groups in the azulmic acids by condensation reactions and can likewise lead to partial stabilizing of the substances according to the invention, being formed very rapidly in situ from monomeric formaldehyde. Because of the tackiness of the concomitant higher-molecular caramelized sugars obtained, these products can be spray-dried completely free from formaldehyde. They are brown-black, humus-like substances with a friable structure, which are on the one hand of interest as agents for improving soil and, on the other hand, as plant nutrients. The sugar mixtures absorbed onto the matrix in this procedure can be complexed with relatively large amounts of calcium hydroxide or magnesium hydroxide, sugar complexes being formed such as are known, for example, with sucrose, 3 mols of calcium oxide being bonded per mol of sucrose. In the case of the use of the substances, according to the invention, containing azulmic acid, formose and calcium hydroxide, the low solubility of complexes of this type advantageously impedes rapid washing out of the sugars when the substances are applied in the agricultural sector.

Furthermore, substances according to the invention can be employed in a diverse manner as agrochemicals, such as agents for improving soil, or fertilizers.

The preparation of the substances according to the invention and their properties are illustrated in the examples which follow.

EXAMPLES

EXAMPLE 1

Comparison experiment: polymerization of monomeric hydrocyanic acid in the presence of potassium cyanate (compare Angew. Chem. 72, (1960) page 380, Example 4)

200 parts by weight of a 30% strength aqueous hydrocyanic acid solution are warmed to 40° to 50° C. in the presence of 1.08 parts by weight of potassium cyanate for 5 hours. The product formed is filtered off, washed successively with distilled water and ethanol and then dried at 80° C. Azulmic acid is obtained in the form of a black powder in a yield of 95% of theory.

Elementary analysis: 41.4% C; 4.0% H; 43.2% N; 11.4% O.

On the basis of the oxygen values given, this azulmic acid, the formula of which is approximately characterized by the formula (I) indicated on page 2 of this Application, has the empirical formula $C_{24}H_{28}O_5N_{22}$ (compare Angew. Chem. 72 (1960) page 383).

Small amounts of monomeric hydrocyanic acid are continuously split off from this polymer, even after careful drying for a long time at room temperature or at 80° C. Subsequent intensive washing and renewed drying, even under a high vacuum, does not stop the splitting back into hydrocyanic acid.

The determination of hydrogen cyanide is carried out by customary methods.

If 2,000 g of the azulmic acid which has been prepared by the method indicated above are stored at 50° C. in a container with a volume of air of 12 liters, after 2 hours a hydrogen cyanide concentration of 0.066 g of hydrogen cyanide per 12 liters of air is measured. A hydrogen cyanide MWC (MWC=maximum workplace concentration) of 4,583 ppm is calculated from this, that is to say a MWC value which is 416 times greater than the legally imposed MWC value of 11 ppm. An azulmic acid of this type is accordingly completely unsuitable for use in practice.

If 10 parts by weight of the azulmic acid prepared by the process above are treated with 100 parts by weight of distilled water at 100° C. for 3 hours and the concentration of cyanide ions in the filtrate is then determined, a concentration of cyanide ions is found which corresponds to a hydrocyanic acid content of from 26 to over 28 mg per liter of water. Such concentrations of cyanide ions already cause destruction and deactivation of important bacteria, and their enzyme systems, occurring in soil.

EXAMPLE 2

Comparison experiment: polymerization of monomeric hydrocyanic acid by the "running in" process in the presence of ammonia (compare German Patent Specification No. 949,060)

A mixture of 5,600 g of water, 1,400 g of hydrocyanic acid and 88 g of ammonia is polymerized precisely according to the statements contained in Example 1 of German Patent Specification 949,060. After a polymerization time of about 5 hours at 50° C. and after discontinuing the cooling, the internal temperature rises to 90° C., remains at this level for about one hour and then falls. The azulmic acid formed is isolated, washed with water and dried at 80° C. Yield: 98% of theory.
Stability to heat:
Storage of 2,000 g of the azulmic acid at 50° C. for two hours (compare Example 1): MWC value over 5,000 ppm.
Stability to hydrolysis:
Treatment of 10 parts by weight of the azulmic acid with 100 parts by weight of distilled water at 100° C. for three hours (compare Example 1): hydrocyanic acid concentration of 30 to 36 mg per liter of water.

EXAMPLE 3

Comparison experiment: treatment of azulmic acid according to Example 1 with ketones in the absence of water In each case 108 g of the azulmic acid prepared according to Example 1 (disregarding the end groups, this amount corresponds on average to 2 base mols of polymerized aminocyanocarbene units having the structure

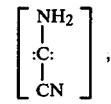

equivalent weight=54) are treated with 4 mols of one of the anhydrous ketones mentioned below and with 4 mols of xylene, which acts as an entraining agent for water, in each case for 30 hours at 120° C.: (a) cyclohexanone, (b) methyl ethyl ketone, (c) diethyl ketone and (d) methyl isobutyl ketone.

Besides small amounts of hydrocyanic acid being split off, with the formation of cyanohydrins (about 0.5 percent by weight), in all cases no formation of polyketimine, associated with the splitting off of water, takes place between the ketones and the amino groups of the azulmic acid. Small amounts of hydrocyanic acid are trapped as cyanohydrins. After the treatment has ended, in each case about 107 g of azulmic acid are isolated, which, according to elementary analysis, is of virtually unchanged composition. These azulmic acid products treated with ketones are not stabilized, but now as before, small amounts of hydrocyanic acid are split off at room temperature and also at 50° C. Even boiling the azulmic acid with acetone for several hours with continuous removal of the acetone does not lead to polyketimines or to substituted crosslinked condensation products containing aminal groups.

EXAMPLE 4

108 g (=2 base mols) of the azulmic acid prepared by the method described in Example 1 are stirred into 1,000 g (=10 mols) of 30% strength aqueous formalin solution and the mixture is kept at 100° C. for 8 hours. Although the azulmic acid is completely insoluble in the reaction medium, on filtration of filtered samples, which are removed from the reaction medium at intervals of one hour in each case, a continuous decrease in formaldehyde is found. A total of about 1.8 mols of formaldehyde is consumed per 2 base mols of aminocyanocarbene units. This corresponds to an amount of about 0.9 mol of formaldehyde per mol of amino groups, which means that in spite of the topochemical, heterogeneous reaction, almost every amino group in the azulmic acid undergoes reaction. The mixture is worked up by a procedure in which the reaction product is filtered off, washed with water and then freed from moisture and traces of formaldehyde with methanol.

Elementary analysis: 44.1% C; 4.4% H; 30.5% N; 21.4% O.

The reaction product is extremely stable towards the splitting off of hydrogen cyanide under the influence of heat. As hydrogen cyanide determinations show, both at room temperature and at 50° C., even only traces of hydrogen cyanide are split off. Hydrocyanic acid cannot be detected even at 160° C.

The hydrolysis test described in Example 1 is likewise negative in this case.

Even in the mother liquor of the reaction product, neither monomeric hydrocyanic acid itself nor its reaction product with formaldehyde, that is to say hydroxyacetonitrile, can be detected.

At 100° C. and under the most diverse conditions, the azulmic acid stabilized with formaldehyde in each case has a value of hydrogen cyanide split off of 0 ppm.

While the azulmic acids prepared according to Example 1 dissolve in 1 N aqueous sodium hydroxide solution even in the cold, hydrogen cyanide being split off and a deep black-colored solution being obtained, the azulmic acid stabilized according to the invention by reaction with formaldehyde is completely stable and insoluble in 1 N aqueous sodium hydroxide solution.

EXAMPLE 5

108 g (=2 base mols) of the azulmic acid prepared according to Example 1 are stirred into a mixture of 970 ml of water and 25 g of a 30% strength formalin solution (=0.25 mol of formaldehyde) and the mixture is kept at 100° C. for 8 hours. Although only some of the amino groups of the azulmic acid react with formaldehyde (aminal formation, methylolation and a crosslinking reaction), after the reaction has ended, a solid product is isolated which is completely resistant towards splitting back into hydrogen cyanide at room temperature. No hydrogen cyanide can be detected even at 50° C. A MWC value of zero thus results for the reaction product.

EXAMPLE 6

In each case 100 g of the stabilized azulmic acids prepared according to Examples 4 to 5 are stirred at room temperature for 2 hours with (a) 0.33 mol of phosphoric acid or (b) 0.48 mol of nitric acid. The mixtures are then worked up by a procedure in which the black solid product present in each case is filtered off and dried. In this manner, phosphoric acid addition salts and nitric acid addition salts of the azulmic acids, stabilized with formaldehyde, employed are obtained, that is to say compounds in which the particular acid is bonded to the polymer matrix via the amino groups, which are still free (=anchor groups), of the stabilized azulmic acids.

EXAMPLE 7

(a) 1,000 g of distilled water and 98 g (1 mol) of phosphoric acid are added to 108 g (2 base mols) of an azulmic acid prepared according to Example 2, after prior drying of the acid, at 80° C. in a closed stirred apparatus and the mixture is heated to 100° C. The reaction mixture is kept at this temperature for 16 hours, and during this time, in which heterogeneous hydrolysis or partial decyclization takes place in the azulmic acid, a stream of nitrogen, serving as a propellant gas, is passed through the reaction mixture at a rate of about 50 ml per minute. The stream of nitrogen issuing from the mixture is passed through two wash bottles connected in series, the first being filled with 200 ml of 1 N aqueous hydrochloric acid in order to bond the ammonia contained in the stream of nitrogen and the second wash bottle being charged with 200 ml of 1 N aqueous sodium hydroxide solution in order to bond the carbon dioxide present in the stream of nitrogen. The amounts of ammonia and carbon dioxide evolved from the azulmic acid are determined tritrimetrically at intervals of 1 to 3 hours. After a reaction time of 16 hours, the total amount of ammonia which is formed by hydrolytic production of $F_1$ structural defects of the formula

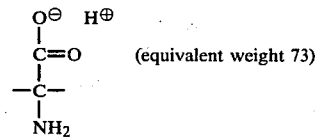

is 6.4 g ($\approx$0.38 mol). The total amount of carbon dioxide which is formed by decarboxylation of $F_1$ structural defects to give $F_2$ structural defects of the formula

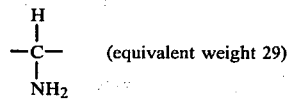

is 4.3 g ($\approx$0.1 mol) (determined tritrimetrically by the barium carbonate method). A round molar $NH_3/CO_2$ quotient of about 3.8 is calculated from these figures. This numerical value indicates that of about 4 carboxyl groups ($F_1$ structural defects) produced by decyclization and saponification of nitrile groups of the azulmic acid, about one is decarboxylated and thus leads to an $F_2$ structural defect.

The mixture is worked up by a procedure in which the solid reaction product is filtered off, washed and dried. 109 g of a (modified) azulmic acid containing $F_1$ structural defects and $F_2$ structural defects are obtained.

On the basis of this yield information and of the molar $NH_3/CO_2$ quotient determined of 3.8, and on the basis of the fact that the $F_2$ structural defects are formed from the $F_1$ structural defects (0.38 mol−0.1 mol=0.28 mol), it can be calculated that 100 parts by weight of the process product contain about 18.6 percent by weight of $F_1$ structural defects and about 2.67 percent by weight of $F_2$ structural defects. The sum of $F_1$ structural defects and $F_2$ structural defects is 21.3 percent by weight.

As the elementary analysis shows, the modified azulmic acid contains about 9.3 percent by weight of phosphoric acid. This phosphoric acid is bonded to the polymer matrix via the free amino groups (anchor groups) of the modified azulmic acid.

(b) A mixture of 100 g of the modified azulmic acid prepared by the method described under (a), 2 mols of formaldehyde and 600 ml of water is heated to 100° C. for 6 hours. Thereafter, the mixture is worked up by a procedure in which the solid product is filtered off, washed and dried. In this manner, 118 g of an azulmic acid containing $F_1$ structural defects and $F_2$ structural defects, which is stabilized with formaldehyde and is extremely stable towards the splitting off of hydrogen cyanide under the influence of heat and under hydrolysis conditions, are obtained. The value for the splitting off of hydrogen cyanide is virtually 0 ppm, even when it is measured under very unfavorable conditions (small volume of air).

As was found in a determination of $NH_2$ groups by the method of van Slyke (compare Angew. Chem. 72 (1960), page 382), the modified azulmic acid used as the starting material in the above reaction contains about 21 percent by weight of reactive $NH_2$ groups ($=$about 1.25 $NH_2$ equivalents) per 100 parts by weight. Accordingly, about 37.5 parts by weight of formaldehyde ($=$about 1.25 equivalents) should be consumed in the azomethine formation ($=N=CH_2$) and the crosslinking of the azomethine groups by polymerization. Balancing of the formaldehyde analytically by the peroxide method of Blank and Finkenbeiner (compare Gattermann-Wieland "Methodden der org. Chemie" ("Methods of Organic Chemistry") and "Die Praxis des Organischen Chemikers" (The Practice of an Organic Chemist), De Gruyter & Co., Berlin 1962, page 180; Ber. 31, 2979 (1898), shows, however, that only about 0.8 mol of formaldehyde has reacted. Thus, in the stabilized azulmic acid prepared according to the above process from a modified azulmic acid and formaldehyde, either 0.45 equivalent of free amino groups are still present, or this 0.45 equivalent of amino groups has reacted intermolecularly or intramolecularly, with aminal formation, according to the equation which follows.

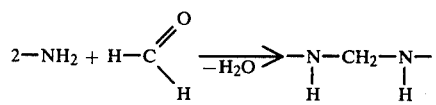

In the latter case, a quantitative condensation of all the amino groups would have been achieved. According to the present state of the analytical methods, it cannot be decided which proportion of amino groups has reacted with formaldehyde in the equivalence ratio 1:1 and which proportion of amino groups has been reacted with formaldehyde in the equivalence ratio 2:1.

EXAMPLE 8

In each case 100 g of an azulmic acid, prepared according to Example 7b, stabilized with formaldehyde are dispersed in 250 g of water and the dispersions are stirred with (a) 10.78 g ($=$0.11 mol) of phosphoric acid or (b) 30.2 g ($=$0.48 mol) of nitric acid at room temperature for 2 hours. Phosphoric acid salts and nitric acid salts of the azulmic acid, stabilized with formaldehyde, employed are obtained in this manner. In this procedure, the inorganic acids are fixed to the polymer matrix via the amino groups which are still free and/or via aminal groups of the formula $>N-CH_2-N<$.

EXAMPLE 9

(a) 1,000 g of distilled water and 0.5 mol of calcium sulphite dihydrate are added to 108 g (2 base mols) of an azulmic acid prepared according to Example 2, after prior drying of the acid, at 80° C. in a closed stirred apparatus and the mixture is heated to 100° C. The reaction mixture is kept at this temperature for 8 hours and, during this time, a stream of nitrogen is passed through at a rate of about 50 ml per minute. The content of ammonia and carbon dioxide in the stream of nitrogen issuing from the reaction mixture is determined in the manner indicated in Example 7. A modified azulmic acid is obtained, the molar $NH_3/CO_2$ quotient of which is 2.68.

(b) A mixture of 100 g of the modified azulmic acid prepared by the method described under (a), 20 g of a 30% strength aqueous formalin solution ($=$0.2 mol of formaldehyde) and 400 g of water is heated to 100° C. for 8 hours. The mixture is then worked up by a procedure in which the solid product is filtered off, washed and dried. In this manner, an azulmic acid containing $F_1$ structural defects and $F_2$ structural defects and stabilized with formaldehyde is obtained, from which, after prior drying at 30°–50° C., no hydrogen cyanide is split off on subsequent storage at room temperature. The reaction product is soluble in 1 N aqueous sodium hydroxide solution.

EXAMPLE 10

In each case 100 g of the stabilized azulmic acid prepared according to Example 9b are stirred at room temperature for 2 hours with (a) an excess of 1 molar phosphoric acid or (b) an excess of 1 molar nitric acid. Thereafter, the solid product is filtered off and dried. Phosphoric acid salts and nitric acid salts of the azulmic acid, stabilized with formaldehyde, employed are obtained in this manner, 0.12 mol of phosphoric acid or 0.51 mol of nitric acid being bonded to 100 parts by weight of stable azulmic acid.

EXAMPLE 11

(a) 1,000 g of deionized water are added to 108 g (2 base mols) of an azulmic acid prepared according to Example 2, after prior drying of the acid, at 80° C. in a closed stirred apparatus and the mixture is heated to 100° C. The reaction mixture, in which the pH value is 6.2, is kept at this temperature for 8 hours, and during this time a stream of nitrogen is passed through at a rate of 50 ml per minute. The content of ammonia and carbon dioxide in the stream of nitrogen issuing from the reaction mixture is determined in the manner indicated in Example 7. The total amount of ammonia evolved is 0.059 mol.

The total amount of carbon dioxide evolved is 0.023 mol.

This gives a molar $NH_3/CO_2$ quotient of 2.57.

By obtaining the difference between the amounts of ammonia and carbon dioxide evolved (0.059−0.023=0.036), it is calculated that about 0.036 equivalent of $F_1$ structural defects is formed and about 0.023 equivalent of $F_2$ structural defects is formed.

Yield of modified azulmic acid: 107 g.

From this yield information, the molar $NH_3/CO_2$ quotient and the difference between the molar amounts of ammonia and carbon dioxide evolved (0.059−0.023=0.036), it is calculated that 100 parts by weight of the process product contain about 2.57 percent by weight of $F_1$ structural defects and about 0.7 percent by weight of $F_2$ structural defects.

(b) A mixture of 100 g of the modified azulmic acid prepared by the method described under (a), 20 g of a 30% strength aqueous formalin solution (=0.2 mol of formaldehyde) and 400 g of water is heated to 100° C. for 8 hours. The mixture is then worked up by a procedure in which the solid product is filtered off, washed and dried. In this manner, an azulmic acid containing $F_1$ structural defects and $F_2$ structural defects and stabilized with formaldehyde, is obtained, from which, after prior drying at 30°–50° C., no hydrogen cyanide is split off on subsequent storage at room temperature. The reaction product is soluble in 1 N aqueous sodium hydroxide solution.

EXAMPLE 12

In each case 100 g of the stabilized azulmic acid prepared according to Example 11b are stirred with (a) an excess of 1 molar phosphoric acid or (b) an excess of 1 molar nitric acid at room temperature for 2 hours. Thereafter, the solid product is filtered off and dried. Phosphoric acid salts and nitric acid salts of the azulmic acid, stabilized with formaldehyde, employed are obtained in this manner, 0.16 mol of phosphoric acid or 0.54 mol of nitric acid being bonded to 100 parts by weight of stabilized azulmic acid.

EXAMPLE 13

(a) 350 g of approximately 25 percent strength by weight aqueous ammonia solution (=87.5 g (about 5.15 mols) of ammonia), which contain 70 g (1.1 mols) of sodium cyanate, are added to 7 liters of 20% strength aqueous hydrocyanic acid (=1,400 g (52 mols) of hydrogen cyanide), while stirring intensively. This mixture is warmed to 40° C. Thereafter, the temperature rises to 70° C. due to the heat of polymerization liberated. The mixture is heated to 90° C. for a further 4 hours and then worked up by a procedure in which the brown-black polymer obtained, which forms no colloidal solutions in water, is filtered off, washed successively with water and ethanol and then dried at 50°–80° C. under reduced pressure. Yield: 94.9% of theory.

Elementary analysis: 40.6% C; 4.1% H; 42.4% N; 12.8% O.

The concentration of the carbonate constituent detected in the mother liquor of the polymerization mixture corresponds to an amount of carbon dioxide evolved of about 0.02 mol per 100 g of polymer. Accordingly, 0.56 percent by weight of $F_2$ structural defects has already been introduced into the product during the preparation of the polymer. Furthermore, on the basis of a molar $NH_3/CO_2$ quotient of about 4, such as has been found for hydrolysis of sodium cyanate-free azulmic acid at 90° C. for two hours in a parallel experiment, an amount of ammonia of 0.08 mol has been evolved per 100 g of the polymer prepared, which corresponds to a content of $F_1$ structural defects of 4 percent by weight.

Thus, the polymer prepared in the above process is an azulmic acid containing $F_1$ structural defects and $F_2$ structural defects, that is to say a modified azulmic acid.

(b) When 100 g of the modified azulmic acid prepared by the method described under (a) are reacted with 0.2 mol of formaldehyde under the conditions indicated in Example 7b, an azulmic acid containing structural defects and stabilized with formaldehyde is formed, from which no hydrogen cyanide is split off at room temperature. The detection of hydrogen cyanide carried out with small Dräger tubes is negative (0 ppm of hydrogen cyanide). CL EXAMPLE 14

When 100 g of the modified azulmic acid prepared according to Example 13a are reacted with 0.2 mol of glyoxal under the conditions indicated in Example 7b, an azulmic acid containing structural defects and stabilized with glyoxal is formed, from which no hydrogen cyanide is split off at room temperature. A hydrogen cyanide detection which was carried out, using a small Dräger tube, in the volume of air over a sample of the process product stored at room temperature is negative.

EXAMPLE 15

108 g of the modified azulmic acid prepared according to Example 13a are stirred into 1,000 g (=10 mols) of 30% strength aqueous formalin solution and the mixture is kept at 100° C. for 8 hours. The mixture is then worked up by a procedure in which the reaction product is filtered off, washed with water and then freed from moisture and traces of formaldehyde with methanol. 150 g of stabilized azulmic acid are obtained, from which no hydrogen cyanide is split off even at 180° C. In the case of a sample stored at 60° C., a value for the splitting off of hydrogen cyanide of 0 ppm is measured.

EXAMPLE 16

(a) 4 liters of 20% strength aqueous hydrocyanic acid, 200 ml of approximately 25% strength aqueous ammonia solution and 40 g of sodium cyanate are stirred together. This reaction mixture is heated to 90° C. in the course of 2 hours. Thereafter, the mixture is stirred at 90° C. for a further 30 minutes, using a very effective reflux condenser and utilizing the hydrocyanic acid reflux, 500 ml of water and a small amount of hydrocyanic acid are then distilled off and 500 ml of water are again added. The mixture is then stirred at 100° C. for 5 hours. The black process product thereby obtained, which can be filtered excellently, is filtered off, washed successively with about 4 liters of water and with methanol and dried under reduced pressure.

Yield: 845 g of azulmic acid containing $F_1$ structural defects and $F_2$ structural defects.

Content of structural defects: about 11 percent by weight.

Elementary analysis: 38.2% C; 4.9% H; 38.8% N; 18.9% O.

As can be seen from these values, the product has a higher oxygen content and a lower nitrogen content than the azulmic acid prepared according to Example 1. This indicates that the product according to the invention contains a large proportion of structural defects ($F_1$ and $F_2$).

(b) 108 g of the modified azulmic acid prepared by the method described under (a) are stirred into 1,000 g (=10 mols) of 30% strength aqueous formalin solution and the mixture is kept at 100° C. for 8 hours. The mixture is then worked up by a procedure in which the reaction product is filtered off, washed with water and then freed from moisture and traces of formaldehyde with methanol. 140 g of stabilized azulmic acid are obtained, from which no hydrogen cyanide is split off even at 200° C. (test for hydrogen cyanide using a small Dräger tube).

Elementary analysis: 45.1% C; 5.1% H; 31.3% N; 18.6% O.

EXAMPLE 17

(a) When the hydrocyanic acid polymerization described in Example 16a is carried out with the aid of aqueous ammonia solution and sodium cyanate, as the catalyst, at 40° C. under the conditions indicated in Example 1, an azulmic acid is obtained which is virtually free from structural defects and thus has a relatively low oxygen content.

Elementary analysis: 41.6% C; 3.9% H; 45.8% N; 7.5% O.

(b) 108 g of the azulmic acid prepared by the method described under (a) are stirred into 1,000 g (=10 mols) of 30% strength aqueous formalin solution and the mixture is kept at 100° C. for 8 hours. The mixture is then worked up by a procedure in which the reaction product is filtered off, washed with water and then freed from moisture and traces of formaldehyde with methanol. 145 g of stabilized azulmic acid are obtained, from which no hydrogen cyanide is split off even at 200° C. (test for hydrogen cyanide using a small Dräger tube).

Elementary analysis: 45.9% C; 4.9% H; 32.6% N; 16.8% O.

As can be seen from these values, this stabilized azulmic acid also contains structural defects. The latter have thus been introduced in the course of the reaction of the azulmic acid virtually free from structural defects, which is used as the starting material, with formaldehyde.

EXAMPLE 18

A mixture of 108 g of the modified azulmic acid prepared according to Example 16a (content of structural defects about 11 percent by weight), 0.5 mol of imidazole and 800 ml of water is warmed to 100° C. for 20 hours. The mixture is then worked up by a procedure in which the solid product is filtered of, washed and dried. A modified azulmic acid is obtained which, on the basis of the balance determined for the splitting off of ammonia and carbon dioxide, contains about 30 percent by weight of $F_1$ structural defects.

When this azulmic acid containing a high proportion of structural defects is reacted with formaldehyde under the conditions indicated in Example 4, a stabilized azulmic acid is obtained, from which no hydrogen cyanide is split off even on prolonged storage at 50° C.

EXAMPLE 19

(a) A mixture of 200 g of the azulmic acid prepared according to Example 13a, with a relatively low content of structural defects (composition: 40.6% C; 4.1% H; 42.4% N; 12.8% O) and 800 g of a 25% strength aqueous ammonia solution is stirred at 25°–31° C. for 8 hours. The black powder is then filtered off, washed with 5 liters of water and dried at room temperature in a vacuum drying cabinet.

Yield: 215 g of a modified azulmic acid which contains about 6–7 percent by weight of ammonia bonded to $F_1$ structural defects. The formula of modified $F_1$ structural defects of this type can be illustrated as follows:

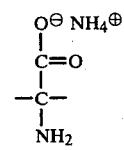

Elementary analysis: 37.6% C; 4.8% H; 38.5% N; 19.4% O.

If the process product is not dried at room temperature but at higher temperatures, ammonia is readily split off.

(b) By reacting 100 g of the modified azulmic acid containing ammonia, prepared by the method described under (a), with 0.2 mol of formaldehyde at 50° C. in an aqueous solution, a product is obtained which does not tend to split off hydrogen cyanide at temperatures up to 30° C.

A stream of nitrogen is passed over some of this process product at 50° C. for four hours at a flow rate of 100 ml of nitrogen per minute. No hydrogen cyanide can be detected analytically in the gas collected (hydrogen cyanide concentration =0 ppm).

Ammonia is readily split off from the process product both under hydrolysis conditions and under the influence of heat. At 50° C., a proportion of ammonia of 1.43 percent by weight is already liberated in the course of one hour.

If the process product, which smells slightly of ammonia, is gassed in the moist state with carbon dioxide, a virtually odorless powder is obtained.

(c) Some of the process product prepared according to (b) is washed thoroughly with water and once again treated with 25% strength aqueous ammonia solution for renewed production of structural defects. The product thereby formed exhibits no tendency to split off hydrogen cyanide even at 50° C.

EXAMPLE 20

(a) A mixture of 200 g of the azulmic acid prepared according to Example 13a, with a relatively low content of structural defects, and 800 g of a 25% strength aqueous ammonia solution is stirred at 80° C. in a closed apparatus for 3 hours. The black powder is then filtered off, washed with 5 liters of water and dried at room temperature in a vacuum drying cabinet. A modified azulmic acid is obtained which contains about 13 percent by weight of ammonia bonded to $F_1$ structural defects.

(b) By reacting 100 g of the modified azulmic acid containing ammonia, prepared by the method described under (a), with 0.2 mol of formaldehyde at 50° C. in an aqueous solution, a product is obtained which does not tend to split off hydrogen cyanide at temperatures up to 60° C.

Ammonia is readily split off from the process product both under hydrolysis conditions and under the influence of heat.

(c) Some of the process product prepared according to (b) is washed thoroughly with water and once again treated with 25% strength aqueous ammonia solution for renewed production of structural defects. The product thereby formed exhibits no tendency to split off hydrogen cyanide even at 70° C.

EXAMPLE 21

(a) A mixture of 108 g of the azulmic acid prepared according to Example 13a, 14 g of calcium thiosulphate hexahydrate and 800 ml of water is warmed to 100° C. for 1.6 hours. The mixture is then worked up by a procedure in which the solid product is filtered off, washed and dried. A modified azulmic acid is obtained which, on the basis of the amounts of ammonia and carbon dioxide evolved, contains about 3.3 percent by weight of $F_1$ structural defects additionally formed and about 1.4 percent by weight of $F_2$ structural defects additionally formed.

(b) By reacting 100 g of the modified azulmic acid prepared according to (a) with 0.2 mol of formaldehyde at 50° C. in an aqueous solution, a product is obtained from which no hydrogen cyanide is split off even on storage at 30° C. for several months. A hydrogen cyanide concentration of 0 ppm is measured in the volume of air in a vessel which is half-filled with the process product.

EXAMPLE 22

(a) A mixture of 108 g of the modified azulmic acid prepared according to Example 13a, 19 g of calcium dihydrogen sulphide hexahydrate and 800 ml of water is warmed to 100° C. for 2 hours. The mixture is then worked up by a procedure in which the solid product is filtered off, washed and dried. A modified azulmic acid is obtained which contains about 2 percent by weight of calcium and, as is given by the amounts of ammonia and carbon dioxide evolved, has an approximate content of $F_1$ structural defects additionally formed of 7 percent by weight and of $F_2$ structural defects additionally formed of 0.9 percent by weight.

(b) By reacting 100 g of the modified azulmic acid prepared according to (a) with 0.2 mol of formaldehyde at 50° C. in an aqueous solution, a product is obtained from which no hydrogen cyanide is split off even on storage at 30° C. for several months. A hydrogen cyanide concentration of 0 ppm is measured in the volume of air in a vessel which is half-filled with the process product.

EXAMPLE 23

(a) A mixture of 108 g of the modified azulmic acid prepared according to Example 13a and 1,000 ml of a 1 N aqueous potassium hydroxide solution is warmed to 100° C. for 44 hours. The azulmic acid employed is thereby already completely dissolved a few minutes after the start of the reaction.

The progress of the saponification reaction is monitored by measuring the amounts of ammonia and carbon dioxide evolved. The amount of ammonia liberated is 12.2 g after 8 hours, 15 g after 22 hours and 17 g (=1 mol) after 44 hours.

In a parallel experiment carried out under exactly the same conditions, it is found, by acidifying the reaction mixture with 2 mols of aqueous hydrochloric acid, that about 21.9 g (=0.5 mol) of carbon dioxide were bonded in the solution as potassium carbonate.

The mixture is worked up by a procedure in which the brown-black aqueous reaction solution is concentrated under 14 mm Hg, methanol is added three times, in an amount of 1 liter each time, to the brown-black dispersion thereby formed and each time the mixture is concentrated by distilling off the methanol and the water still present, and the crystals which remain are then boiled up briefly once again with 800 ml of methanol and filtered off. 113 g of a water-soluble product with a humus-like color are obtained.

Elementary analysis: 31.5% C; 3.9% H; 26.8% N; 21.0% O; 16.1% K.

The amounts measured of ammonia and carbon dioxide liberated give a molar $NH_3/CO_2$ quotient of 2.

The difference between the numbers of mols of ammonia and carbon dioxide determined is about 0.5. This factor indicates that about half of all the $F_1$ structural defects have been converted into $F_2$ structural defects.

On the basis of these figures, it is calculated that 100 parts by weight of the process product contain about 55 percent by weight of potassium salt $F_1$ structural defects of the formula

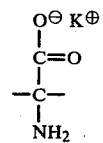

and about 14.5 percent by weight of $F_2$ structural defects. In this method for producing structural defects, in each case one potassium salt $F_1$ structural defect of the above formula is accordingly formed per 2 cyclic units of the azulmic acid. In the ideal case, a product of this type can be illustrated by the formula which follows:

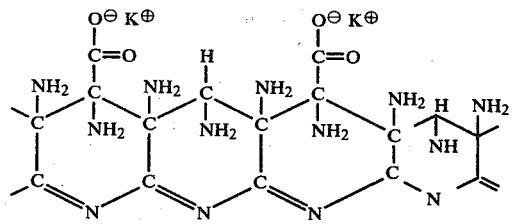

If both the polymolecularity of the process product and the fact that oxygen atoms in the form of carbonyl groups (which help to increase the oxygen content) are present in the "anionic" and "cationic" portion of end groups in the azulmic acid, the values found in the elementary analysis are in relatively good agreement with those for products which have average molecular weights of between 600 and 800. By way of comparison, the elementary composition which follows is calculated for a single command or empirical formula $C_{21}H_{28}N_{17}O_9K_3$ (molecular weight =789): 32.4% C; 3.5% H; 30.5% N; 18.5% O; 15.1% K.

The process product, which can be described as a polyelectrolyte, contains a low-molecular fraction which is particularly readily soluble in water and, on the basis of its elementary composition, can be illustrated approximately by the formula which follows:

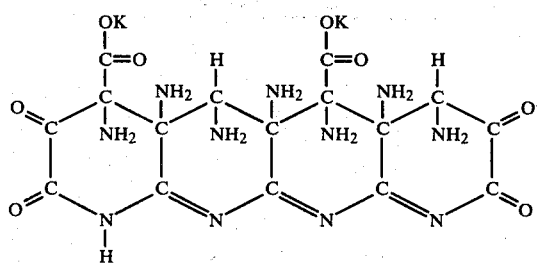

(molecular weight 569).

Elementary analysis of the low-molecular product B 35.7% C; 2.5% H; 23.5% N; 23.7% O; 14.5% K.

(b) By reacting the azulmic acid potassium salt prepared by the method described under (a) with formaldehyde in an aqueous solution, an azulmic acid potassium salt/formaldehyde condensation product is formed which is stable towards the splitting off of hydrogen cyanide.

The salts, listed in Table 1 which follows of modified azulmic acids are also obtained by the method described in Example 23a by reacting azulmic acid prepared according to Example 13a with the corresponding bases or basic salts.

TABLE 1

| Example No. | Base or salt | Product | Color |
|---|---|---|---|
| 24a | $K_2CO_3$ | Azulmic acid potassium salt | humus-colored |
| 25a | $KHCO_3$ | Azulmic acid potassium salt | " |
| 26a | $Na_2S$ | Azulmic acid sodium salt | " |
| 27a | $K_2S$ | Azulmic acid potassium salt | " |
| 28a | $Na_2S_2O_3$ | Azulmic acid sodium salt | " |
| 29a | LiOH | Azulmic acid lithium salt | " |

The compounds listed in Table 2 which follows are obtained from the azulmic acid potassium salt, prepared according to Example 23a, by reaction with metal halides, metal hydroxides, nitrates or metal sulphates in an aqueous solution.

TABLE 2

| Example No. | Metal salt or base | Product |
|---|---|---|
| 30a | $Ca(OH)_2$ | Azulmic acid calcium salt |
| 31a | $Ba(OH)_2$ | Azulmic acid barium salt |
| 32a | $PbCl_4$ | Azulmic acid lead salt |
| 33a | $MgCl_2$ | Azulmic acid magnesium salt |
| 34a | $SrCl_2$ | Azulmic acid strontium salt |
| 35a | $FeSO_4$ | Azulmic acid iron salt |
| 36a | $CoSO_4$ | Azulmic acid cobalt salt |
| 37a | $CuSO_4$ | Azulmic acid copper salt |
| 38a | $MnSO_4$ | Azulmic acid manganese salt |
| 39a | $NiCl_2$ | Azulmic acid nickel salt |
| 40a | $ZnSO_4$ | Azulmic acid zinc salt |
| 41a | $SnCl_2$ | Azulmic acid tin salt |
| 42a | $CdSO_4$ | Azulmic acid cadmium salt |
| 43a | $Bi_2(SO_4)_3$ | Azulmic acid bismuth salt |
| 44a | $Al_2(SO_4)_3$ | Azulmic acid aluminum salt |
| 45a | $AgNO_3$ | Azulmic acid silver salt |
| 46a | $HgCl_2$ | Azulmic acid mercury salt |
| 47a | $AuCl_2$ | Azulmic acid gold salt |

The condensation products listed in Table 3 below are also obtained by the method indicated in Example (23b) from the corresponding salts of azulmic acid and formaldehyde.

TABLE 3

| Example No. | Formaldehyde condensation product of: | |
|---|---|---|
| 26b | Azulmic acid sodium salt | (26a) |
| 29b | Azulmic acid lithium salt | (29a) |
| 30b | Azulmic acid calcium salt | (30a) |
| 31b | Azulmic acid barium salt | (31a) |
| 32b | Azulmic acid lead salt | (32a) |
| 33b | Azulmic acid magnesium salt | (33a) |
| 34b | Azulmic acid strontium salt | (34a) |
| 35b | Azulmic acid iron salt | (35a) |
| 36b | Azulmic acid cobalt salt | (36a) |
| 37b | Azulmic acid copper salt | (37a) |
| 38b | Azulmic acid manganese salt | (38a) |
| 39b | Azulmic acid nickel salt | (39a) |
| 40b | Azulmic acid zinc salt | (40a) |
| 41b | Azulmic acid tin salt | (41a) |
| 42b | Azulmic acid cadmium salt | (42a) |
| 43b | Azulmic acid bismuth salt | (43a) |
| 44b | Azulmic acid aluminum salt | (44a) |
| 45b | Azulmic acid silver salt | (45a) |
| 46b | Azulmic acid mercury salt | (46a) |
| 47b | Azulmic acid gold salt | (47a) |

EXAMPLE 48

A mixture of 108 g (2 base mols) of the azulmic acid prepared according to Example 1, 4 mols of glyoxal, 1,000 g of distilled water and 100 g of ethanol is warmed to 100° C. for 16 hours, while stirring intensively. The mixture is then worked up by a procedure in which the solid product is filtered off, washed and dried. 140 g of an azulmic acid/glyoxal condensation product are obtained, from which no hydrogen cyanide is split off even on prolonged storage at temperatures between 20° and 40° C.

From the amount of carbon dioxide evolved during the reaction and on the basis of a molar $NH_3/CO_2$ quotient of 3.2, the process product contains between 4 and 6 percent by weight of $F_1$ structural defects and $F_2$ structural defects. The above condensation reaction accordingly proceeds with simultaneous production of structural defects.

The condensation products listed in Table 4 below are obtained by the method described in Example 48, by reacting in each case 108 g of the azulmic acid prepared according to Example 1 with 4 mols of the appropriate aldehyde.

TABLE 4

| Example No. | Aldehyde | Product | Yield (in g) |
|---|---|---|---|
| 49 | Acetaldehyde | Az/acetaldehyde condensation product | 115 |
| 50 | Propionaldehyde | Az/propionaldehyde condensation product | 126 |
| 51 | Isobutyraldehyde | Az/isobutraldehyde condensation product | 124 |
| 52 | Hydroxypivalaldehyde | Az/hydroxypivalaldehyde condensation product | 125 |
| 53 | Acrolein | Az/acroleinaldehyde condensation product | 143 |
| 54 | Glucose | Az/glucose condensation product | 128 |
| 55 | Salicylaldehyde | Az/salicylaldehyde condensation product | 121 |
| 56 | Furfurol | Az/furfurol condensation product | 125 |
| 57 | ω-Hydroxymethylfurfurol | Az/ω-hydroxymethylfurfurol condensation product | 139 |
| 58 | Chloral hydrate | Az/chloralhydrate | 149 |

TABLE 4-continued

| Example No. | Aldehyde | Product | Yield (in g) |
|---|---|---|---|
| | | condensation product | |

"Az" in each case represents "azulmic acid".

EXAMPLE 59

A mixture of 108 g of the azulmic acid prepared according to Example (13a), 0.3 mol of formaldehyde, 600 g of distilled water and 100 g of finely powdered ash of tobacco leaves (composition of the ash, calculated relative to oxides of the elements: 29.1% of $K_2O$; 3.2% of $Na_2O$; 36.0% of CaO; 7.4% of MgO; 1.9% of $Fe_2O_3$; 4.7% of $P_2O_5$; 3.1% of $SO_3$; 5.8% of $SiO_2$ and 6.7% of $Cl_2$) is warmed to 100° C. for 6 hours, while stirring intensively. The mixture is then worked up by a procedure in which the solid product is filtered off, washed and dried. 195 g of an azulmic acid/formaldehyde condensation product which contains tobacco ash and has an excellent stability towards the splitting off of hydrocyanic acid are obtained.

Measurement of the amounts of ammonia and carbon dioxide evolved during the reaction shows that the condensation reaction proceeds with simultaneous production of structural defects.

The condensation products listed in Table 5 below are obtained by the method described in Example 59, by reacting in each case 108 g of the azulmic acid prepared according to Example (13a) with 0.3 mol of formaldehyde in the presence of additives.

TABLE 5

| Example No. | Additive | Amount of additive employed [g] | Yield (in g) |
|---|---|---|---|
| 60 | Finely powdered ash of willow wood | 100 | 198 |
| 61 | Ash residues of broom, beech and birch leaves in the ratio 1:1:1 (dry weight) | 100 | 196 |
| 62 | Ash of spruce wood | 100 | 199 |
| 63 | Customary garden mold with a moisture content of about 40% by weight | 424 | 377 |
| 64 | Polymethyleneurea of the formula $H_2N-C(=O)-NH-(CH_2-NH-C(=O)-NH)_{4-14}H$ | 100 | 205 |
| 65 | Peat | 100 | 180 |
| 66 | 1:1 mixture of insoluble calcium cyanate and calcium cyanamide | 100 | 185 |
| 67 | Powdered, sparingly soluble isobutyraldehyde/urea condensate (molar ratio 1:1) | 100 | 197 |
| 68 | Powdered, sparingly soluble isobutyraldehyde/urea condensate (molar ratio 2:1) | 100 | 193 |
| 69 | Isobutyraldehyde/urea condensate (molar ratio 1:2.5) | 100 | 190 |
| 70 | Powdered, sparingly soluble crotonaldehyde/urea condensate (molar ratio 1:2) | 100 | 189 |
| 71 | Powdered, sparingly soluble crotonaldehyde/urea condensate (molar ratio 1:1) | 100 | 193 |
| 72 | Powdered, sparingly soluble crotonaldehyde/urea condensate, prepared from 1 mol of crotonaldehyde and 2 mols of urea, essentially consisting of [structure: triazine-like ring with HN, NH, CH-NH-C(=O)-NH₂, H₃C-CH, CH₂, C=O groups] | 100 | (see below) |
| 73 | Ground basic slag | 100 | 205 |
| 74 | Phosphorite | 100 | 203 |
| 75 | Rhenania phosphate | 100 | 198 |
| 76 | Active charcoal powder | 100 | 204 |
| 77 | Hydrated alumina | 100 | 207 |
| 78 | Silicon dioxide | 100 | 206 |

EXAMPLE 79

(a) 34 g of approximately 25% strength aqueous ammonia solution, which contains 6.8 g of sodium cyanate, are added to 600 ml of 18% strength aqueous hydrocyanic acid and 100 g of polymethyleneurea, while stirring intensively. After warming the mixture to 40° C., the temperature rises to 70° C. due to the heat of polymerization liberated. The mixture is heated to 90° C. for a further 4 hours and then worked up by a procedure in which the polymer is filtered off, washed successively with water and ethanol and then dried under reduced pressure.

Yield: 201 g of modified azulmic acid which contains polymethyleneurea. Nitrogen content of the process product: 38.9%.

(b) A mixture of 200 g of the modified azulmic acid prepared according to (a), containing polymethyleneurea, 200 ml of a 30% strength aqueous formalin solution (=2 mols of formaldehyde) and 1,200 ml of distilled water is heated to 100° C. for 3 hours. After working up, a pulverulent azulmic acid/polymethyleneurea/formaldehyde condensation product is obtained which is completely stable towards the splitting off of hydrogen cyanide. On prolonged storage, a hydrogen cyanide concentration of 0 ppm is measured in vessels containing air. About 1.6 mols of formaldehyde have been taken up during the condensation reaction.

Modified azulmic acids containing the additives listed in Table 6 below are also prepared by the method described in Example (79a). In each case 1 liter of 19.2% strength aqueous hydrocyanic acid is polymerized in the presence of in each case 180 g of additive.

TABLE 6

| Example No. | Additive | Yield (in g) | Nitrogen content of the product |
|---|---|---|---|
| 80a | Active charcoal | 342 | 22.9% |
| 81a | Bleaching earth | 340 | 22.7% |
| 82a | Asbestos flour | 354 | 20.1% |
| 83a | Trilon B | 170 | 41.8% |
| 84a | Starch (insoluble) | 342 | 22.4% |
| 85a | Fly ash "M" | 353 | about 22% |
| 86a | Peat (moist) | 155 | 31.3% |

The azulmic acid/additive/formaldehyde condensation products listed in Table 7 below are also prepared by the method described in Example (79b).

TABLE 7

| Example No. | Condensation product of | |
|---|---|---|
| 80b | Az/active charcoal + formaldehyde | (80a) |
| 81b | Az/bleaching earth + formaldehyde | (81a) |
| 82b | Az/asbestos flour + formaldehyde | (82a) |
| 83b | Az/Trilon B + formaldehyde | (83a) |
| 84b | Az/starch (insoluble) + formaldehyde | (84)a |
| 85b | Az/fly ash "M" + formaldehyde | (85a) |
| 86b | Az/peat (moist) + formaldehyde | (86a) |

"Az" in each case represents "azulmic acid".

EXAMPLE 87

100 g of the azulmic acid prepared according to Example (13a) and stabilized by condensation with a little formaldehyde are stirred with an excess of aqueous nitric acid at room temperature for 10 minutes. Thereafter, the solid product is filtered off and washed with a little water. An azulmic acid-nitric acid adduct is obtained in which 0.51 mol of nitric acid are bonded per 100 parts by weight of stabilized azulmic acid. Accordingly, in spite of a heterogeneous reaction of about 4 amino groups which are present in about 216 parts by weight of the azulmic acid employed, on average one amino group within the polycyclic matrix is converted into a grouping of the formula

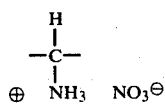

Elementary analysis of the product isolated: 35.2% C; 4.3% H; 38.9% N; 20.9% O.

The process product contains about 19.2% by weight of nitrate ions.

Since in the case of the preparation of azulmic acids of this type, containing nitrate ions, there is the danger that when the products are washed with a large quantity of water some of the nitrate ions contained therein dissociate off, it is appropriate to wash the product only with a little water and to gas the moist powder, which still contains portions of nitric acid which is not ionically bonded, with ammonia. Nitric acid which is not ionically bonded is converted into ammonium nitrate by this measure.

EXAMPLE 88

100 g of the azulmic acid prepared according to Example (13a) and stabilized by condensation with a little formaldehyde are stirred with an excess of 2 normal aqueous nitric acid at room temperature for 5 minutes. Thereafter, the solid product is filtered off and washed with a little water. An azulmic acid-nitric acid adduct is obtained in which 0.64 mol of nitric acid are bonded per 100 parts by weight of stabilized azulmic acid. Accordingly, on average about 1.3 amino group equivalents are used for salt formation with nitric acid per 4 amino group equivalents in 216 parts by weight of stabilized azulmic acid.

Further experiments show that the proportion of nitric acid absorbed is greater, the more finely divided (for example particle size $<100\mu$) is the stabilized azulmic acid employed.

The adducts listed in Table 8 below are also obtained by the method described in Example (87), by reacting in each case 100 parts by weight of an azulmic acid stabilized with a little formaldehyde with an excess of the particular acid.

TABLE 8

| Example No. | Adduct of | Amount of acid bonded per 100 g of azulmic acid |
|---|---|---|
| 89 | Az + oleic acid | 0.33 mol |
| 90 | Az + ricinoleic acid | 0.25 mol |
| 91 | Az + dibutylphosphoric acid | 0.25 mol |
| 92 | Az + 2-ethylcaproic acid | 0.35 mol |
| 93 | Az + acrylic acid | 0.38 mol |
| 94 | Az + methacrylic acid | 0.4 mol |
| 95 | Az + maleic acid | 0.4 mol |
| 96 | Az + maleic acid oleyl alcohol monoester | 0.34 mol |

"Az" in each case represents "stabilized azulmic acid".

The compounds listed in Examples 89–96 have a hydrophobic character.

EXAMPLE 97

100 g of azulmic acid stabilized with formaldehyde and with a content of $F_1$ structural defects of about 2.6 percent by weight and a content of $F_2$ structural defects of 0.6 percent by weight are stirred with 0.5 mol of cadmium-II chloride and 600 ml of distilled water at room temperature for 6 hours. Thereafter, the solid product is filtered off, washed thoroughly with water and dried at 100° C. A black finely powdered product with a cadmium content of 8.1 percent by weight is isolated. The process product is azulmic acid, stabilized with formaldehyde, which contains cadmium-II chloride bonded as a complex. The azulmic acid complex salt is completely stable towards the splitting off of hydrogen cyanide.

The complex salts listed in Table 9 below are also obtained by the method described in Example 97, by reacting in each case 100 g of azulmic acid stabilized with formaldehyde with in each case 0.5 mol of chloride or sulphate of the corresponding metal.

TABLE 9

| Example No. | Metal salt | Metal content of the azulmic acid complex |
|---|---|---|
| 98 | $MnSO_4$ | 3.65% by weight |
| 99 | $SnCl_2$ | 23.5% by weight |
| 100 | $CuSo_4$ | 10.4% by weight |
| 101 | $HgCl_2$ | 28.4% by weight |
| 102 | $CoCl_2$ | 5.2% by weight |
| 103 | $ZnCl_2$ | 10.4% by weight |
| 104 | $FeSO_4$ | 6.8% by weight |
| 105 | $PbCl_2$ | 25.8% by weight |
| 106 | $Bi(NO_3)_3$ | 21% by weight |
| 107 | $AgNO_3$ | 26.7% by weight |

EXAMPLE 108

(a) A mixture of 108 g of azulmic acid which is almost free from structural defects, 1 mol of the azulmic acid-cadmium chloride complex prepared according to Example 97 and 1,000 g of distilled water is stirred at 70° C. for 8 hours. The solid product is then filtered off, washed and dried. An azulmic acid-cadmium chloride complex with a relatively high content of $F_1$ structural defects and $F_2$ structural defects is obtained. The content of $F_1$ structural defects is about 10–12 percent by weight.

(b) 120 g of the azulmic acid-cadmium chloride complex containing structural defects, prepared by the method described under (a), are treated with 1 mol of formaldehyde in an aqueous medium at 50° C. for 6 hours. Thereafter, the solid product is filtered off, washed and dried. An azulmic acid-cadmium chloride complex stabilized by formaldehyde is obtained, from which no hydrogen cyanide is split off even at 180° C. The product has a cadmium content of 17.3 percent by weight.

(c) 120 g of the product prepared according to (b) are stirred with an excess of 1 N aqueous sodium hydroxide solution at 25° C. for 2 hours. Thereafter, the solid product is filtered off, washed and dried. An azulmic acid-cadmium hydroxide complex stabilized by formaldehyde is obtained.

The azulmic acid complexes, containing structural defects, listed in Table 10 below are obtained in the manner indicated in Example 108 under (a) by reacting azulmic acid which is relatively free from structural defects with the corresponding azulmic acid-metal salt complex.

TABLE 10

| Example No. | Azulmic acid-metal salt complex | Content of $F_1$ structural defects [%] |
| --- | --- | --- |
| 109a | Az—MnSO$_4$ complex | 9 |
| 110a | Az—Sn—Cl$_2$ complex | 12 |
| 111a | Az—CuSO$_4$ complex | 8 |
| 112a | Az—HgCl$_2$ complex | 7 |
| 113a | Az—CoCl$_2$ complex | 10.5 |
| 114a | Az—ZnCl$_2$ complex | 13 |
| 115a | Az—FeSO$_4$ complex | 8 |
| 116a | Az—PbCl$_2$ complex | 9 |
| 117a | Az—Bi(NO$_3$)$_3$ complex | 8 |
| 118a | Az—AgNO$_3$ complex | 7 |

"Az" in each case represents "azulmic acid".

The azulmic acid metal salt complexes listed in Table 10 are subjected to a condensation reaction with formaldehyde by the method indicated in Example 108 under (b). The azulmic acid-metal salt complexes, stabilized with formaldehyde, listed in Table 11 below are thereby obtained.

TABLE 11

| Example No. | Formaldehyde condensation product of: | Metal content |
| --- | --- | --- |
| 109b | Az—MnSO$_4$ complex according to Example 109a | 3.2% of Mn |
| 110b | Az—SnCl$_2$ complex according to Example 110a | 18% of Sn |
| 111b | Az—CuSO$_4$ complex according to Example 111a | 9.6% of Cu |
| 112b | Az—HgCl$_2$ complex according to Example 112a | 26% of Hg |
| 113b | Az—CoCl$_2$ complex according to Example 113a | 5.3% of Co |
| 114b | Az—ZnCl$_2$ complex according to Example 114a | 9.5% of Zn |
| 115b | Az—FeSO$_4$ complex according to Example 115a | 7.2% of Fe |
| 116b | Az—PbCl$_2$ complex according to Example 116a | 23.8% of Pb |

"Az" in each case represents "azulmic acid".

When silver salt complexes, gold salt complexes or platinum salt complexes of azulmic acid are used, products stabilized with formaldehyde and with a metal content of over 29 percent by weight can be prepared.

EXAMPLE 119

A mixture of 100 g of azulmic acid which is almost free from structural defects, 17 g of copper nitrate trihydrate, 300 g of formic acid and 80 g of water is stirred at 60°-70° C. for 6 hours, while passing 25 liters of air through per hour. Thereafter, the solid product is filtered off, washed and dried. An azulmic acid-copper nitrate complex with a content of $F_1$ structural defects of about 8.9 percent by weight and a content of $F_2$ structural defects of about 2.3 percent by weight is obtained. 0.8 percent by weight of oxamide, which is formed, from monomeric hydrocyanic acid which has been split off, in the course of the oxidative production of structural defects and simultaneous complexing, is also isolated.

The product can be stabilized by reaction with formaldehyde.

EXAMPLE 120

(a) A mixture of 108 g of the azulmic acid prepared according to Example 13a, 1 mol of iron-II sulphate and 800 ml of distilled water is stirred at 100° C. for 10 hours. Thereafter, the solid product is filtered off, washed with 5% strength aqueous ammonia solution and dried. An azulmic acid is obtained which contains a relatively high proportion of structural defects (up to 20 percent by weight) and has the composition: 30.3% C; 3.6% H; 28.7% N; 26.8% O; 11.5% Fe.

120 g of the azulmic acid-iron complex, which contains a high proportion of structural defects, prepared according to (a) are treated with 120 g of 30% strength formaldehyde solution in an aqueous medium at 50° C. for 5 hours. An azulmic acid-iron complex stabilized by condensation with formaldehyde is obtained, from which no hydrogen cyanide is split off even at 180° C.

The azulmic acid-metal salt complexes listed in Table 12 which follows are also prepared by the method indicated in Example (120a).

TABLE 12

| Example No. | Metal compound used | Composition of the product |
| --- | --- | --- |
| 121a | CuSO$_4$ | 24.5% C; 2.2% H; 22.6% N; 23.8% O; 3.3% S; 23.9% Cu |
| 122a | FeCl$_3$ | 35.7% C; 3.1% H; 33.3% N; 22.3% O; 1.7% Cl; 4.4% Fe |
| 123a | ZnCl$_2$ | 23.5% C; 2.2% H; 21.6% N; 19.1% O; 34.1% Zn |
| 124a | CoCl$_2$ | 28.4% C; 2.7% H; 27.8% N; 20.4% O; 20.2% Co |
| 125a | Cu(OCOCH$_3$)$_2$ | 22.3% C; 2.6% H; 22.6% N; 18.4% O; 33.9% Cu |
| 126a | SnCl$_2$ | 14.7% C; 2.3% H; 12.9% N; 24.8% N; 44.3% Sn |
| 127a | MnSO$_4$ | 28.4% C; 3.1% H; 26.6% N; 24.2% O; 17.6% Mn |
| 128a | SnCl$_2$ (0.4 mol) | 23.4% C; 2.7% H; 21.0% N; 21.9% O; 25.9% Sn |
| 129a | ZnCl$_2$ (0.5 mol) | 29.2% C; 2.6% H; 29.5% N; 19.1% O; 19.8% Zn |
| 130a | PbCl$_2$ | 58.3% Pb |
| 131a | Bi(NO$_3$)$_3$ | 59.1% Bi |
| 132a | Tl$_2$SO$_4$ | 57.9% Tl |
| 133a | TiCl$_4$ (Xylol) | 25.2% Ti |
| 134a | Zr(SO$_4$)$_2$ | 38.9% Zr |
| 135a | H$_2$WO$_4$ | 55.8% W |
| 136a | NiCl$_2$ | 29.2% Ni |
| 137a | AgNO$_3$ | 43.1% Ag |
| 138a | HgCl$_2$ | 58.3% Hg |
| 139a | HAuCl$_4$ | 56% Au |
| 140a | H$_2$PtCl$_6$ | 55.5% Pt |

The azulmic acid-metal salt complexes listed in Table 12 are reacted with formaldehyde by the method indicated in Example (120b). The azulmic acid-metal salt complex condensation products listed in Table 13 which follows are thereby obtained.

TABLE 13

| Example No. | Formaldehyde condensation product of: |
|---|---|
| 121b | Az—Cu complex according to Example 121a |
| 122b | Az—Fe complex according to Example 122a |
| 123b | Az—Zn complex according to Example 123a |
| 124b | Az—Co complex according to Example 124a |
| 125b | Az—Cu complex according to Example 125a |
| 126b | Az—Sn complex according to Example 126a |
| 127b | Az—Mn complex according to Example 127a |
| 128b | Az—Sn complex according to Example 128a |
| 129b | Az—Zn complex according to Example 129a |
| 130b | Az—Pb complex according to Example 130a |
| 131b | Az—Bi complex according to Example 131a |
| 132b | Az—Tl complex according to Example 132a |
| 133b | Az—Ti complex according to Example 133a |
| 134b | Az—Zr complex according to Example 134a |
| 135b | Az—W complex according to Example 135a |
| 136b | Az—Ni complex according to Example 136a |
| 137b | Az—Ag complex according to Example 137a |
| 138b | Az—Hg complex according to Example 138a |
| 139b | Az—Au complex according to Example 139a |
| 140b | Az—Pt complex according to Example 140a |

"Az" in each case represent "azulmic acid".

No hydrogen cyanide is split off from the products listed in Examples (121b)–(140b), even at 180° C.

EXAMPLE 141

(a) A mixture of 100 g of azulmic acid which is almost free from structural defects, 100 g of gelatin, 100 g of cellulose powder, 0.8 mol of phosphoric acid and 1,200 ml of water is stirred at 60° C. for 2 hours. Thereafter, the solid product is filtered off, washed and dried. A mixed product consisting of azulmic acid and of cellulose powder and gelatin and their degradation products, which contains a relatively high proportion of structural defects and contains phosphoric acid, is isolated.

120 g of the product prepared according to (a) are treated with 1 mol of formaldehyde in 300 g of water at 50° C. for 5 hours. Thereafter, the solid product is filtered off, washed and dried. A mixed product consisting of azulmic acid, cellulose powder and gelatin and the degradation products of these naturally occurring substances, which is stabilized by condensation with formaldehyde and contains phosphoric acid, is isolated.

EXAMPLE 142

A mixture of 108 g of azulmic acid with a content of $F_1$ structural defects of about 2.5% by weight, a content of $F_2$ structural defects of about 0.5% by weight and a total concentration of amino groups of about 19% by weight ($=1.12$ $NH_2$ equivalents per 100 g of azulmic acid), 0.2 equivalents of formaldehyde ($=6$ g in 20 parts by weight of water) and 500 g of distilled water is stirred at 100° C. for 4 hours. The process product is filtered off, washed with water and then stirred with 300 g of a 0.2% strength aqueous ammonia solution at room temperature for one hour, traces of formaldehyde still contained in the mixture being converted into water-soluble hexamethylenetetramine. The product (azulmic acid partially condensed with formaldehyde), which has been isolated by filtration and washed again with water, is then stirred well with 140 g of microbially active garden mold (moisture content 40% by weight) in 500 g of water at 35° C. for 30 hours, while passing about 50 ml of air over per minute. On working up the mixture, an ammonia-containing mixed product consisting of partially stabilized azulmic acid and microbially active garden mold is obtained. No hydrogen cyanide can be detected in the filtrate of the reaction product.

A total of 5.56 g of carbon dioxide is evolved while stirring the partially stabilized azulmic acid with microbially active garden mold for 30 hours. The carbon dioxide content of 90 liters of air, determined in a parallel experiment, and the amount of carbon dioxide produced by the microbial activity of the 140 g of garden mold (sum=2.5 g of carbon dioxide) are subtracted from this amount. It is thus calculated that 3.06 g (0.07 mol) of carbon dioxide are formed by decarboxylation of $F_1$ structural defects, that is to say newly produced $F_2$ structural defects in the azulmic acid. About 2 percent by weight of $F_2$ structural defects have accordingly been formed, per 100 g of partially stabilized azulmic acid employed, in the course of the stirring in the presence of the microbially active garden mold.

EXAMPLE 143

(a) 108 g of the stabilized azulmic acid, prepared according to Example 4, which is completely free of formaldehyde are dispersed in 1,000 g of deionized water, 103 g (0.3 mol) of cane sugar, 31 g of dried yeast (=standardized purchasable dried yeast preparation from Messrs. Dr. A. Oetker, Bielefeld), 1 g of ammonium carbonate and 1 g of primary potassium phosphate are added and the mixture is stirred at 35° C., whereupon the alcoholic fermentation proceeding according to the equation which follows starts immediately.

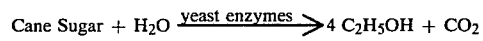

$$\text{Cane Sugar} + H_2O \xrightarrow{\text{yeast enzymes}} 4\, C_2H_5OH + CO_2$$

A stream of nitrogen is passed through the apparatus at a rate of 50 ml per minute in order to remove the carbon dioxide thereby formed. The gas mixture issuing from the apparatus is freed from the carbon dioxide it contains, in a receiver charged with 1 normal aqueous sodium hydroxide solution. The amount of carbon dioxide bonded by the sodium hydroxide solution in the form of sodium carbonate is determined titrimetrically by the barium carbonate method after 1, 2, 4 and 8 hours. The results here are always reproducible and show that, in contrast to a control experiment (yeast preparation, water, cane sugar) the alcohol fermentation process proceeds with only minimum retardation.

After an experiment time of 8 hours, the amount of carbon dioxide evolved is 47 g. This corresponds to a conversion of cane sugar of about 89% of theory.

(b) If the fermentation experiment described under (a) is carried out using the azulmic acid prepared according to Example 1, which has not been stabilized, a cane sugar conversion of 18–20% is measured after stirring for eight hours. Accordingly, the yeast enzymes are so severely deactivated by the cyanide ions contained in the reaction mixture that the alcoholic fermentation is drastically inhibited.

The test described under (a) thus makes qualitative detection of cyanide ions possible.

EXAMPLE 144

A mixture of 108 g (2 base mols) of the black, non-stabilized azulmic acid prepared according to Example 1, 500 g of distilled water and 20 g of a 30% strength aqueous formalin solution (=0.2 mol of formaldehyde) is stirred at 100° C. for 4 hours. Thereafter, the solid product is filtered off, washed and dried. Yield: 112 g of an azulmic acid condensation product which is relatively resistant towards the splitting off of hydrogen cyanide. In the air space of vessels which are half-filled with the process products, a hydrogen cyanide concentration of 0 ppm is measured after storage at 50° C. for ten days.

The carbon dioxide formed by the production of $F_2$ structural defects during the four hour condensation reaction is determined titrimetrically. A total of 0.88 g (0.02 mol) of carbon dioxide is evolved, which correponds to a content of $F_2$ structural defects of 0.53 percent by weight.

In a parallel experiment carried out under exactly the same conditions, the mother liquor remaining after filtering off the process product is concentrated. The hexamethylenetetramine, which is formed by reaction of the ammonia formed, during the production of $F_1$ structural defects, with formaldehyde is isolated from the yellowish-brown residue thereby obtained, by extraction with chloroform. Yield: 2.8 g of hexamethylenetetramine.

Since 140 g of hexamethylenetetramine contain 68 g of ammonia in the bonded form, it is calculated from the yield of hexamethylenetetramine given that about 0.08 mol of ammonia are formed in the course of the condensation reaction. Furthermore, the difference between the molar amounts of ammonia and carbon dioxide shows that 0.06 mol of $F_1$ structural defects have not been converted into $F_2$ structural defects. The content of $F_1$ structural defects in the process product is accordingly about 4 percent by weight. Total amount of structural defects ($F_1$ and $F_2$): 4.53 percent by weight.

From this, it follows that, during the condensation reaction, structural defects have simultaneously been produced.

EXAMPLE 145

(a) The following substances are stirred into 1,800 g of distilled water: 108 g of the modified azulmic acid prepared according to Example 13a, 10 g of normal peat, 5 g of a commercially available limed peat, 5 g of potassium nitrate, 10 g of calcium cyanamide, 5 g of calcium nitrate, 20 g of a calcium sulphite waste liquor, which contains about 40% of lignin-sulphonates and lignin-carbohydrate compounds, 15 g of calcium dihydrogen phosphate, 5 g of peat which has been prepared by processing peat with waste products of animal and vegetable origin, 10 g of Leuna saltpeter (ammonium sulphate 0.2 ammonium nitrate), 5 g of calcium ammonium nitrate (ammonium nitrate+calcium carbonate), 5 g of a limed peat fertilizer which consists of carbonated lime, magnesium carbonate and about 20% by weight of peat, 5 g of a 10% strength solution, rendered alkaline with potassium hydroxide, of humic acids, 50 g of a sparingly soluble condensation product of 1 mol of urea and 1 mol of isobutyraldehyde, 30 g of a polymethyleneurea of the formula

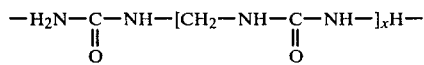

x = 4-12 and 0.5 g of iron-II sulphate, 0.2 g of copper sulphate, 0.2 g of manganese-II sulphate and 0.1 g of zinc sulphate. The well-stirred dispersion is heated to 80° C. and kept at this temperature for 4 hours.

(b) In a parallel experiment, 100 g of the modified azulmic acid prepared according to Example 13a are treated with the trace element salts listed, in the amounts indicated and under the conditions given under (a), but without further additives. From the ammonia/carbon dioxide balance thereby determined, it is found that about 0.2 mol of ammonia and about 0.05 mol of carbon dioxide are evolved. This gives a molar $NH_3/CO_2$ quotient of 4. The difference between the molar amounts of ammonia and carbon dioxide (0.1−0.05=0.15) shows that 0.15 eqivalent of $F_1$ structural defects and about 0.05 equivalent of $F_2$ structural defects have been produced. About 10.2% by weight of $F_1$ structural defects and about 1.45% by weight of $F_2$ structural defects have accordingly been formed. Total content of structural defects ($F_1+F_2$): 11.65% by weight.

On the basis of the results of this comparison experiment, it can be assumed that an analogous concentration of structural defects is present in the process product prepared according to (a).

(c) After the production of structural defects which is described under (a), the well-stirred mixture is treated with 300 g of a 30% strength aqueous formalin solution at 30° C. for 3 hours. Thereafter, the water and unreacted formaldehyde are removed by concentrating the reaction mixture under 14 mm Hg until it has a slurry-like consistency. The slurry, which still contains water, is poured into a pan and dried at 60° C. in vacuum drying cabinet. 333 g of a friable, black-brown substance are obtained which, in addition to the trace elements iron, copper, manganese and zinc, also contains potassium, nitrogen and phosphorus as well as about 15 percent by weight of water. The nutrient ions are present in the product in a form available to plants.

In the air space of vessels which are half-filled with the process products, a hydrogen cyanide concentration of 0 ppm is measured after heating to 50° C. for 50 hours.

What is claimed is:

1. A process for the preparation of stabilized azulmic acids comprising condensing an azulmic acid with a carbonyl compound in an aqueous medium.

2. The process of claim 1 wherein said azulmic acid is an azulmic acid which contains less than 0.5 percent by weight of

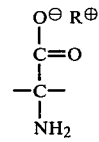

groups and less than 0.5 percent by weight of

groups.

3. The process of claim 2 wherein the condensation reaction is conducted in the presence of a material selected from the group consisting of wood flour; lignin powder; lignin-sulphonic acids; ammonified lignin-sulphonic acids; humus, humic acids; ammonified humic acids; peat; proteins and their degradation products; algal material; polypeptides; fish-meal; bone-meal; aminoacids; oligopolypeptides; pectins; monosaccharides; disaccharides; oligosaccharides; polysaccharides; hemicelluloses; charcoals and ashes which are obtainable by oxidation of organic substances formed by photosynthesis or of customary fuels; metallic silicates; silicon dioxides; silicic acids and salts thereof; silica gels; clay minerals; mica; metallic and ammonia carbonates; phosphorite; metallic and ammonium phosphates; metallic and ammonium sulphates; metallic oxides; aminoplast condensates; polymeric quinones; addition products and condensation products of quinones with amines, ammonia and aldehydes; crosslinked gelatin; urea/formaldehyde resin flakes; formose sugar mixtures prepared from formaldehyde; sparingly soluble cane sugar complexes; hexamethylenetetramine; hexahydrotriazines; superphosphate; basic slag; Rhenania phosphate; calcium cyanamide; calcium ammonium nitrate; Leuna saltpeter; potassium nitrate; ammonium nitrate; metal hydroxides; and cobalt molybdate; and mixtures thereof.

4. The process of claim 2 wherein the condensation reaction is conducted in the presence of a substance from the group consisting of celluloses, hemicelluloses, sugars, lignin, polymeric quinones, wood flour, vegetable material, polypeptides, such as gelatin and wool, and yeast proteins, algal compositions and peat compositions and in the presence of an acid.

5. The process of claim 1 wherein the resultant product is treated with an acid or a base.

6. The process of claim 1 wherein said azulmic acid is a modified azulmic acid containing from 0.5 to 55 percent by weight of ionic groups of the formula

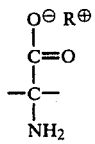

wherein R represents hydrogen, ammonium, one equivalent of a protonated or quaternized organic nitrogen base or of a sulphonium cation or one equivalent of a metal cation, and containing from 0.5 to 15 percent by weight of groups, formed by decarboxylation cations, of the formula

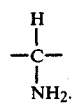

7. The process of claim 6 wherein the condensation reaction is conducted in the presence of a material selected from the group consisting of wood flour; lignin powder; lignin-sulphonic acids; ammonified lignin-sulphonic acids; humus, humic acids; ammonified humic acids; peat; proteins and their degradation products; algal material; polypeptides; fish-meal; bone-meal; aminoacids; oligopolypeptides; pectins; monosaccharides; disaccharides; oligosaccharides; polysaccharides; hemicelluloses; charcoals and ashes which are obtainable by oxidation of organic substances formed by photosynthesis or of customary fuels; metallic silicates; silicon dioxides; silicic acids and salts thereof; silica gels; clay minerals; mica; metallic and ammonium carbonates; phosphorite; metallic and ammonium phosphates; metallic and ammonium sulphates; metallic oxides; aminoplast condensates; polymeric quinones; addition products and condensation products of quinones with amines, ammonia and aldehydes; crosslinked gelatin; urea/formaldehyde resin flakes; formose sugar mixtures prepared from formaldehyde; sparingly soluble cane sugar complexes; hexamethylenetetramine; hexahydrotriazines; superphosphate; basic slag; Rhenania phosphate; calcium cyanamide; calcium ammonium nitrate; Leuna saltpeter; potassium nitrate; ammonium nitrate; metal hydroxides; and cobalt molybdate; and mixtures thereof.

8. The process of claim 1 wherein said azulmic acid is an acid addition salt comprising a salt formed by the addition of a proton of an inorganic or organic acid onto an amino group or other suitable group of a stabilized azulmic acid prepared by condensing a carbonyl compound with a modified azulmic acid, said modified azulmic acid containing from 0.5 to 55 percent by weight of ionic groups of the formula

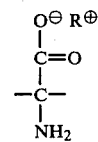

wherein R represents hydrogen, ammonium, one equivalent of a protonated or quaternized organic nitrogen base or of a sulphonium cation or one equivalent of a metal cation, and containing from 0.5 to 15 percent by weight of groups, formed by decarboxylation cations of the formula

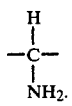

9. The process of claim 8 wherein the condensation reaction is conducted in the presence of a material selected from the group consisting of wood flour; lignin powder; lignin-sulphonic acids; ammonified lignin-sulphonic acids; humus, humic acids; ammonified humic acids; peat; proteins and their degradation products; algal material; polypeptides; fish-meal; bone-meal; aminoacids; oligopolypeptides; pectins; monosaccharides; disaccharides; oligosaccharides; polysaccharides; hemicelluloses; charcoals and ashes which are obtainable by oxidation of organic substances formed by photosynthesis or of customary fuels; metallic silicates; silicon dioxides; silicic acids and salts thereof; silica gels; clay minerals; mica; metallic and ammonium carbonates; phosphorite; metallic and ammonium phosphates; metallic and ammonium sulphates; metallic oxides; aminoplast condensates; polymeric quinones; addition products and condensation products of quinones with amines, ammonia and aldehydes; crosslinked gelatin; urea/formaldehyde resin flakes; formose sugar mixtures prepared from formaldehyde; sparingly soluble cane sugar complexes; hexamethylenetetramine; hexahydrotriazines; superphosphate; basic slag; Rhenania phosphate; calcium cyanamide; calcium ammonium nitrate; Leuna saltpeter; potassium nitrate; ammonium nitrate;

metal hydroxides; and cobalt molybdate; and mixtures thereof.

10. The process of claim 1 wherein said azulmic acid is an azulmic acid complex compound comprising a complex of a metal compound or an ammonium salt with a modified azulmic acid, said modified azulmic acid containing from 0.5 to 55 percent by weight of ionic groups of the formula

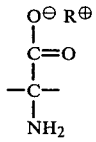

wherein R represents hydrogen, ammonium, one equivalent of a protonated or quaternized organic nitrogen base or of a sulphonium cation or one equivalent of a metal cation, and containing from 0.5 to 15 percent by weight of groups, formed by decarboxylation cations, of the formula

11. The process of claim 10, wherein the condensation reaction is conducted in the presence of a material selected from the group consisting of wood flour; lignin powder; lignin-sulphonic acids; ammonified lignin-sulphonic acids; humus, humic acids; ammonified humic acids; peat; proteins and their degradation products; algal material; polypeptides; fish-meal; bone-meal; aminoacids; oligopolypeptides; pectins; monosaccharides, disaccharides; oligosaccharides; polysaccharides; hemicelluloses; charcoals and ashes which are obtainable by oxidation of organic substances formed by photosynthesis or of customary fuels; metallic silicates; silicon dioxides; silicic acids and salts thereof; silica gels; clay minerals; mica; metallic and ammonium carbonates; phosphorite; metallic and ammonium phosphates; metallic and ammonium sulphates; metallic oxides; aminoplast condensates; polymeric quinones; addition products and condensation products of quinones with amines, ammonia and aldehydes; crosslinked gelatin; urea/formaldehyde resin flakes; formose sugar mixtures prepared from formaldehyde; sparingly soluble cane sugar complexes; hexamethylenetetramine; hexahydrotriazines; superphosphate; basic slag; Rhenania phosphate; calcium cyanamide; calcium ammonium nitrate; Leuna saltpeter; potassium nitrate; ammonium nitrate; metal hydroxides; and cobalt molybdate; and mixtures thereof.

12. The process of claim 1 wherein said azulmic acid is a modified azulmic acid containing from 0.5 to 55 percent by weight of ionic groups of the formula

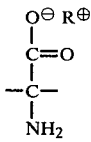

wherein R represents hydrogen, ammonium, one equivalent of a protonated or quaternized organic nitrogen base or of a sulphonium cation or one equivalent of a metal cation, and containing from 0.5 to 15 percent by weight of groups, formed by decarboxylation cations of the formula

which has been reacted with a base in an aqueous medium, the cation having been optionally replaced by treatment with metal salts.

13. The process of claim 12 wherein the condensation reaction is conducted in the presence of a material selected from the group consisting of wood flour; lignin powder; lignin-sulphonic acids; ammonified lignin-sulphonic acids; humus, humic acids; ammonified humic acids; peat; proteins and their degradation products; algal material; polypeptides; fish-meal; bone-meal; aminoacids; oligopolypeptides; pectins; monosaccharides; disaccharides; oligosaccharides; polysaccharides; hemicelluloses; charcoals and ashes which are obtainable by oxidation of organic substances formed by photosynthesis or of customary fuels; metallic silicates; silicon dioxides; silicic acids and salts thereof; silica gels; clay minerals; mica; metallic and ammonium carbonates; phosphorite; metallic and ammonium phosphates; metallic and ammonium sulphates; metallic oxides; aminoplast condensates; polymeric quinones; addition products and condensation products of quinones with amines, ammonia and aldehydes; crosslinked gelatin; urea/formaldehyde resin flakes; formose sugar mixtures prepared from formaldehydes; sparingly soluble cane sugar complexes; hexamethylenetetramine; hexahydrotriazines; superphosphate; basic slag; Rhenania phosphate; calcium cyanamide; calcium ammonium nitrate; Leuna saltpeter; potassium nitrate; ammonium nitrate; metal hydroxides; and cobalt molybdate; and mixtures thereof.

14. The process of claim 1 wherein said azulmic acid is a modified azulmic acid containing from 0.5 to 55 percent by weight of ionic groups of the formula

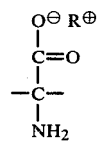

wherein R represents hydrogen, ammonium, one equivalent of a protonated or quaternized organic nitrogen base or of a sulphonium cation or one equivalent of a metal cation, and containing from 0.5 to 15 percent by weight of groups, formed by decarboxylation cations, of the formula

which has been treated with an organic or inorganic acid in an aqueous medium.

15. The process of claim 14 wherein the condensation reaction is conducted in the presence of a material selected from the group consisting of wood flour; lignin powder; lignin-sulphonic acids; ammonified lignin-sulphonic acids; humus, humic acids; ammonified humic acids; peat; proteins and their degradation products; algal material; polypeptides; fish-meal; bone-meal; aminoacids; oligopolypeptides; pectins; monosaccharides; disaccharides; oligosaccharides; polysaccharides; hemicelluloses; charcoals and ashes which are obtainable by oxidation of organic substances formed by photosynthesis or of customary fuels; metallic silicates; silicon dioxides; silicic acids and salts thereof; silica gels; clay minerals; mica; metallic and ammonium carbonates; phosphorite; metallic and ammonium phosphates; metallic and ammonium sulphates; metallic oxides; aminoplast condensates; polymeric quinones; addition products and condensation products of quinones with amines, ammonia and aldehydes; crosslinked gelatin; urea/formaldehyde resin flakes; formose sugar mixtures prepared from formaldehyde; sparingly soluble cane sugar complexes; hexamethylenetetramine; hexahydrotriazines; superphosphate; basic slag; Rhenania phosphate; calcium cyanamide; calcium ammonium nitrate; Leuna saltpeter; potassium nitrate; ammonium nitrate; metal hydroxides; and cobalt molybdate; and mixtures thereof.

16. Stabilized azulmic acids comprising products formed by the condensation of carbonyl compounds with azulmic acids.

* * * * *